(12) United States Patent
Binley

(10) Patent No.: US 10,800,464 B2
(45) Date of Patent: Oct. 13, 2020

(54) PICKUP TRUCK RACK SYSTEM

(71) Applicant: Trent Binley, Eastvale, CA (US)

(72) Inventor: Trent Binley, Eastvale, CA (US)

( * ) Notice: Subject to any disclaimer, the term of this patent is extended or adjusted under 35 U.S.C. 154(b) by 0 days.

(21) Appl. No.: 16/231,472

(22) Filed: Dec. 22, 2018

(65) Prior Publication Data
US 2019/0210663 A1 Jul. 11, 2019

Related U.S. Application Data

(60) Provisional application No. 62/614,401, filed on Jan. 6, 2018.

(51) Int. Cl.
| | |
|---|---|
| *B62D 33/02* | (2006.01) |
| *B60P 3/40* | (2006.01) |
| *B60R 9/06* | (2006.01) |
| *B60R 9/10* | (2006.01) |
| *B60R 9/12* | (2006.01) |
| *B60R 9/08* | (2006.01) |
| *B62D 33/027* | (2006.01) |

(52) U.S. Cl.
CPC ............ *B62D 33/0207* (2013.01); *B60P 3/40* (2013.01); *B60R 9/06* (2013.01); *B60R 9/08* (2013.01); *B60R 9/10* (2013.01); *B60R 9/12* (2013.01); *B62D 33/0273* (2013.01)

(58) Field of Classification Search
CPC ...... F16C 35/04; F16C 35/042; F16C 35/045; F16C 13/04; B62D 33/0207; B60P 3/40
USPC ......... 224/402–403, 405; 384/461, 275, 416, 384/418–419; 403/195
See application file for complete search history.

(56) References Cited

U.S. PATENT DOCUMENTS

| | | | | | |
|---|---|---|---|---|---|
| 1,506,856 | A | * | 9/1924 | McCluskey | F16C 19/55 384/461 |
| 2,667,002 | A | * | 1/1954 | Clore | G09F 21/04 40/592 |
| 2,720,414 | A | * | 10/1955 | Hart | B62D 33/08 296/12 |
| 4,733,471 | A | * | 3/1988 | Rahe | A01D 34/90 30/276 |
| 4,842,460 | A | * | 6/1989 | Schlesch | B60P 7/0892 188/32 |
| 5,137,158 | A | * | 8/1992 | Brockway | B60R 7/02 211/106.01 |
| 5,143,415 | A | * | 9/1992 | Boudah | B60R 9/00 224/325 |
| 5,439,152 | A | | 8/1995 | Campbell | |

(Continued)

*Primary Examiner* — Scott T McNurlen
(74) *Attorney, Agent, or Firm* — Total Awareness Consulting Services; Robert Winslow

(57) ABSTRACT

A rack system has: a first anchor to connect to a first side wall of a bed of a vehicle below a top of the first side wall and above a floor of the bed; a second anchor to connect to a second side wall of the bed below a top of the second side wall and above the floor; a first angle adjuster rotatably connected to the first anchor and having a first locking mechanism to lock at a first angle and a second angle; a second angle adjuster rotatably connected to the second anchor and having a second locking mechanism to lock at the first angle and the second angle; a first support member connected to the first angle adjuster; a second support member connected to the second angle adjuster; and a cross-member connected between the first support member and the second support member.

20 Claims, 35 Drawing Sheets

(56) References Cited

U.S. PATENT DOCUMENTS

| | | | | |
|---|---|---|---|---|
| 6,196,602 B1 * | 3/2001 | Esplin | .................. | B60P 7/08 |
| | | | | 224/405 |
| 6,517,134 B2 * | 2/2003 | Armstrong | ................ | B60P 3/40 |
| | | | | 224/405 |
| 6,863,198 B1 * | 3/2005 | Darby | .................. | B60R 7/02 |
| | | | | 224/403 |
| 7,246,839 B1 | 7/2007 | Nyberg | | |
| 7,258,380 B1 | 8/2007 | Aguilar | | |
| 7,419,075 B2 | 9/2008 | Green | | |
| 8,777,288 B2 | 7/2014 | Johnasen | | |
| 9,718,391 B1 | 8/2017 | Oxley et al. | | |
| 9,725,046 B2 | 8/2017 | Perry | | |
| 9,802,549 B1 * | 10/2017 | Shen | .................. | B60R 9/06 |
| 9,862,330 B2 | 1/2018 | Sayegh et al. | | |
| 9,896,136 B2 | 2/2018 | Corona | | |
| 2004/0134953 A1 * | 7/2004 | Perez | .................. | B60P 3/40 |
| | | | | 224/403 |
| 2018/0111564 A1 * | 4/2018 | Merino | .................. | B60R 9/06 |

* cited by examiner

2200

2200

PICKUP TRUCK RACK SYSTEM

CROSS-REFERENCE TO RELATED APPLICATIONS

This application claims the benefit of U.S. Provisional Application No. 62/614,401, filed Jan. 6, 2018, which is hereby incorporated by reference in its entirety.

BACKGROUND

Many existing rack systems for pickup trucks may not adjust to multiple height configurations. Many existing rack systems for pickup trucks may not adjust to a height configuration that is taller than the cab of the pickup truck to secure loads longer than the bed of the pickup truck. Many existing rack systems for pickup trucks may not adjust to a height configuration that is lower than the top of the cab to allow for improved handling of the vehicle at highway speeds for loads that are shorter than the bed. Many existing rack systems for pickup trucks may not adjust to a height configuration that is lower than the top of the cab to allow for increased fuel efficiency for loads that are shorter than the bed. Many existing rack systems for pickup trucks may not adjust to a height configuration that is below the bed side wall height to allow for employment of, for example, a tonneau cover over the bed or portions thereof. Many existing rack systems for pickup trucks may not adjust to a height configuration that is below the bed side wall height to deter theft. Many existing rack systems may restrict the amount and/or size of items that may be stored on the bed floor underneath the rack systems. Many existing rack systems may be available in fixed widths only and may not adapt to a plurality of bed widths. Many existing rack systems may not be compatible with bed widths of certain pickup truck models or model years. Many existing rack systems may not be adaptable to changes in bed width when users of the rack systems move from a first pickup truck to a second pickup truck. What is needed is an improved pickup truck rack system.

DETAILED DESCRIPTION OF EMBODIMENTS

Figure 1:
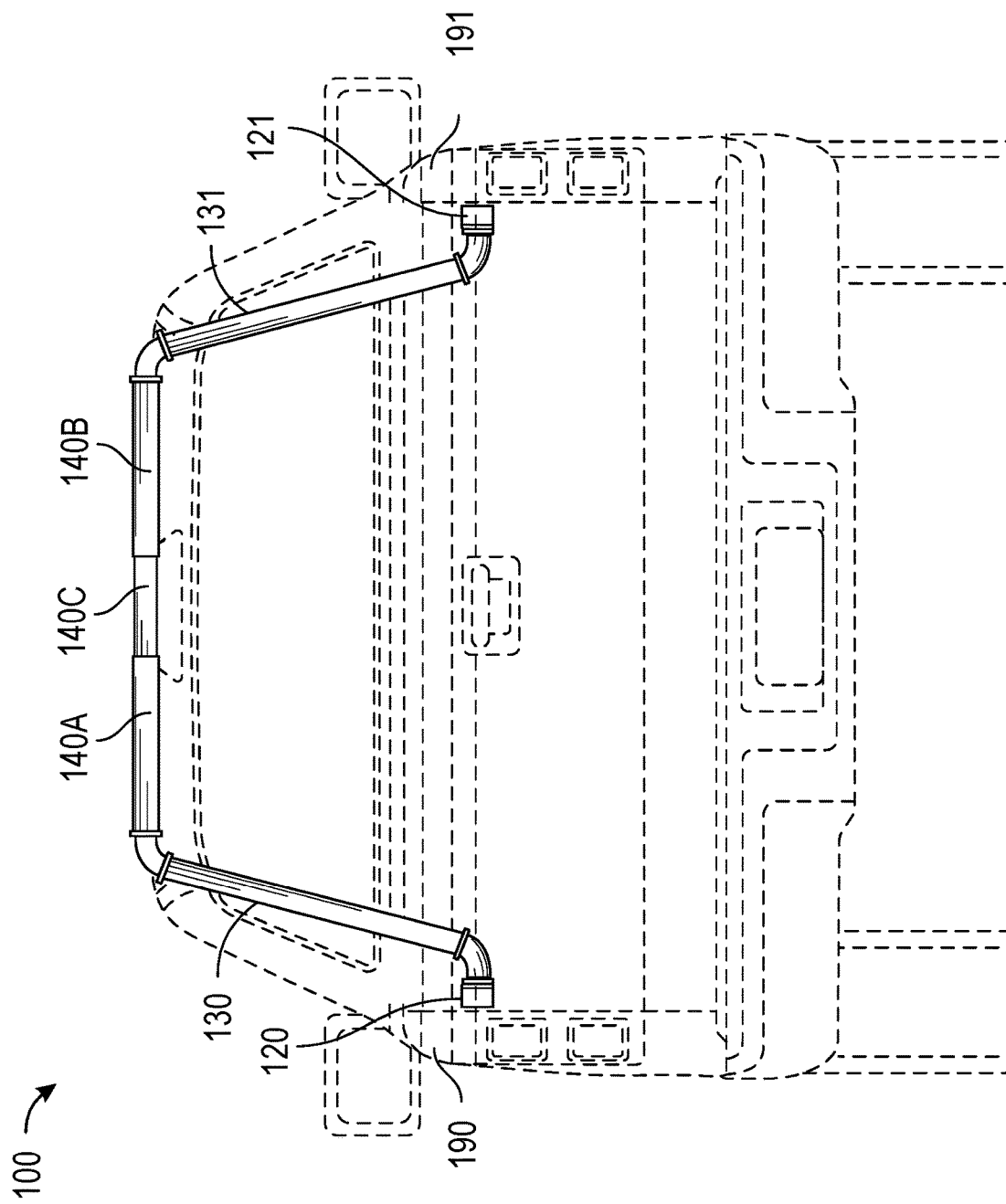
FIG. 1 illustrates an example rack system as per an aspect of various embodiments.

Embodiments include one or more rack systems. The rack systems may be employed with a vehicle such as, for example, a pickup-truck.

According to an embodiment, a rack system may comprise a first anchor. The first anchor may be structurally configured to connect to a first side wall of a bed. The bed may be part of a vehicle. The first anchor may be structurally configured to connect to the first side wall at a position that is below a top of the first side wall. The first anchor may be structurally configured to connect to the first side wall at a position that is above a floor of the bed. The rack system may comprise a second anchor. The second anchor may be structurally configured to connect to a second side wall of the bed. The second anchor may be structurally configured to connect to the second side wall at a position that is below a top of the second side wall. The second anchor may be structurally configured to connect to the second side wall at a position that is above the floor. The rack system may comprise a first angle adjuster. The first angle adjuster may be rotatably connected to the first anchor. The first angle adjuster may comprise a first locking mechanism. The first locking mechanism may be structurally configured to lock at a first angle. The first angle may, for example, be relative to a vertical position. The first locking mechanism may be structurally configured to lock at a second angle. The second angle may, for example, be relative to a vertical position. The rack system may comprise a second angle adjuster. The second angle adjuster may be rotatably connected to the second anchor. The second angle adjuster may comprise a second locking mechanism. The second locking mechanism may be structurally configured to lock at the first angle. The second locking mechanism may be structurally configured to lock at the second angle.

According to an embodiment, a rack system may comprise a first support member. The first support member may be connected to a first angle adjuster. The rack system may comprise a second support member. The second support member may be connected to a second angle adjuster. The rack system may comprise a cross-member. The cross-member may be connected between the first support member and the second support member.

According to an embodiment, a first angle may position a cross-member higher than a cab height of a vehicle. A second angle may position the cross-member lower than the top of a first side wall and lower than the top of a second side wall. A first locking mechanism and a second locking mechanism may each be structurally configured to lock at a third angle. The third angle may, for example, be relative to a vertical position. The third angle may position the cross-member lower than the cab height of the vehicle, and higher than the top of the first side wall and the top of the second side wall. The first locking mechanism and the second locking mechanism may each be structurally configured to lock at a fourth angle. The forth angle may, for example, be relative to a vertical position. The fourth angle may position the cross-member lower than a top of a first wheel well and lower than a top of a second wheel well. The first locking mechanism and the second locking mechanism may each be structurally configured to lock at a fifth angle. The fifth angle may, for example, be relative to a vertical position. The fifth angle may position the cross-member in contact with a floor of a bed. The first locking mechanism and the second locking mechanism may each be structurally configured to lock at additional angles for additional cross-member positions.

According to an embodiment, a first support member may comprise a first horizontal extension. A second support member may comprise a second horizontal extension. The first horizontal extension may be configured to slide into the second horizontal extension. The first horizontal extension and/or the second horizontal extension may be employed as a cross-member.

According to an embodiment, a first support member may comprise a first horizontal extension. A second support member may comprise a second horizontal extension. A third member may be configured to slide inside both the first horizontal extension and the second horizontal extension. The first horizontal extension, the second horizontal extension, the third member, or combinations thereof, may be employed as a cross-member.

According to an embodiment, a cross-member, a first support member, and a second support member may collectively comprise at least one bearing support member. Each of the at least one bearing support member may be structurally configured to support an inner race of at least one bearing. The cross-member, first support member, and second support member may collectively comprise at least one inner tube. Each of the at least one inner tube may comprise a first outer surface. Each of the at least one inner tube may comprise a first inner surface. The first inner surface may be structurally configured to be at least partially supported by an outer race of the at least one bearing. The cross-member, first support member, and second support member may collectively comprise at least one outer tube. Each of the at least one outer tube may comprise a second outer surface. Each of the at least one outer tube may comprise a second inner surface. The second inner surface may be structurally configured to be at least partially supported by the first outer surface of the at least one inner tube. The cross-member may be structurally configured to rotate with respect to the first support member and the second support member. The cross-member may be structurally configured to be fixed to the first support member and/or the second support member. The cross-member may be structurally configured to adjust to a plurality of lengths. A rack system comprising the cross-member may therefore be structurally configured to adjust to a plurality of lengths, to accommodate such as, for example, the width of a pickup truck bed. The first support member and the second support member may each be structurally configured to adjust to a plurality of lengths.

FIG. 1 illustrates an example rack system 100, mounted to a pickup truck, as per an aspect of various embodiments. The rack system may comprise a first anchor and adjuster assembly 120. The first anchor and adjuster assembly 120 may comprise a first anchor and a first angle adjuster. The first anchor may be structurally configured to connect to a first side wall 190. The rack system may comprise a second anchor and adjuster assembly 121. The second anchor and adjuster assembly 121 may comprise a second anchor and a second angle adjuster. The second anchor may be structurally configured to connect to a second side wall 191. The rack system may comprise a first support member 130. The rack system may comprise a second support member 131. The rack system may comprise a cross-member. The cross-member may comprise a first tube 140A, a second tube 140B, and a third tube 140C. In this example, the third tube 140C comprises an inner tube. The third tube 140C may be fixed in relation to the first support member 130 and the second support member 131. The first tube 140A and the second tube 140B may each comprise an outer tube. The first tube 140A and the second tube 140B may each be structurally configured to rotate with respect to the third tube 140C, the first support member 130, and the second support member 131. In another example, the third tube 140C may comprise an outer tube. The third tube 140C may be structurally configured to rotate with respect to the first tube 140A, the second tube 140B, the first support member 130, and the second support member 131. The first tube 140A and the second tube 140B may each comprise an inner tube. The first tube 140A may be fixed in relation to the first support member 130. The second tube 140B may be fixed in relation to the second support member 131.

Figure 2:
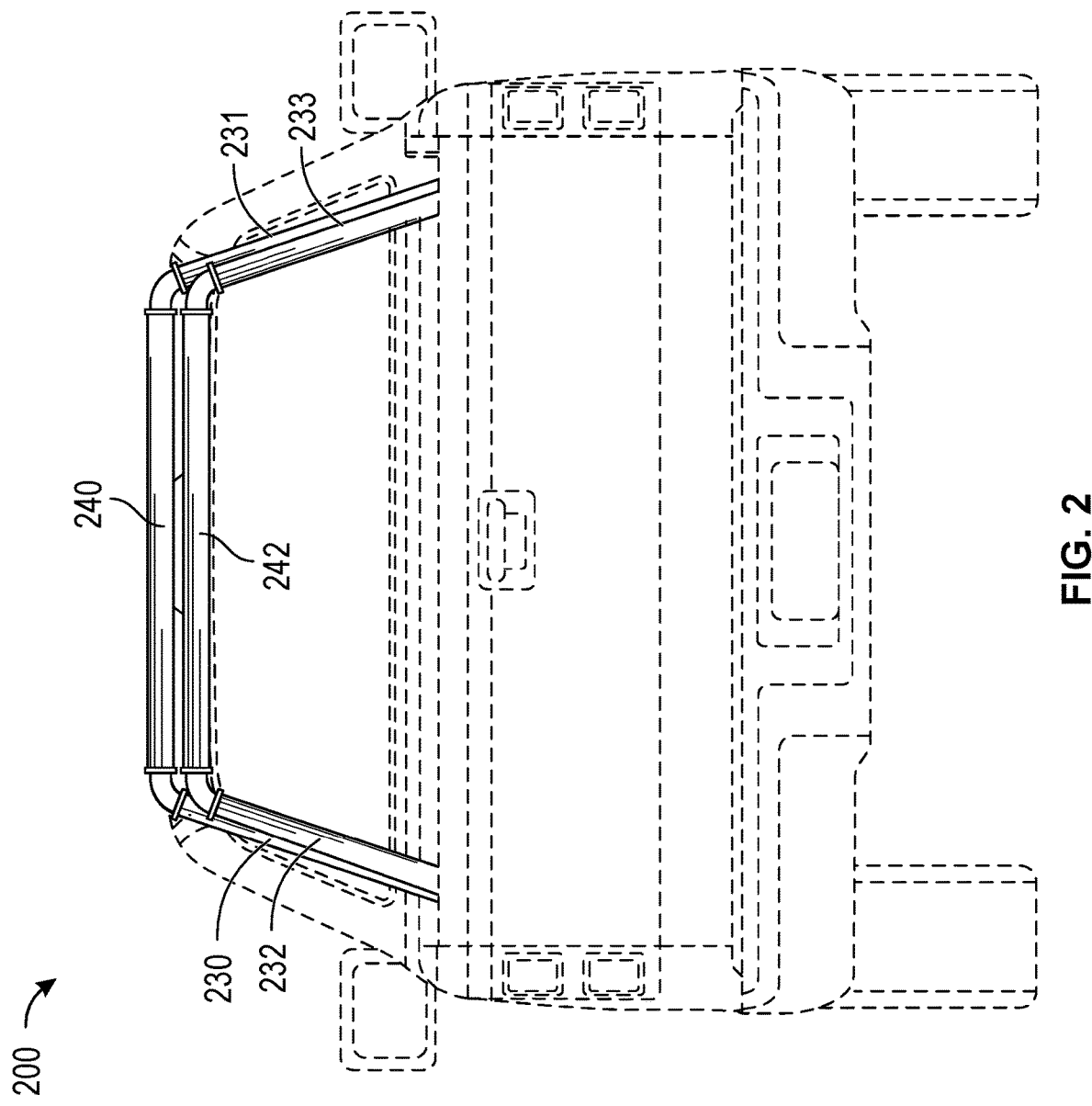
FIG. 2 illustrates an example pair of rack systems as per an aspect of an embodiment.

FIG. 2 illustrates an example pair of rack systems 200, mounted to a pickup truck, as per an aspect of an embodiment. A first rack system in the pair of rack systems may comprise a first support member 230 and a second support member 231. The first rack system may comprise a first cross-member 240. A second rack system in the pair of rack systems may comprise a third support member 232 and a forth support member 233. The second rack system may comprise a second cross-member 242.

Figure 3:
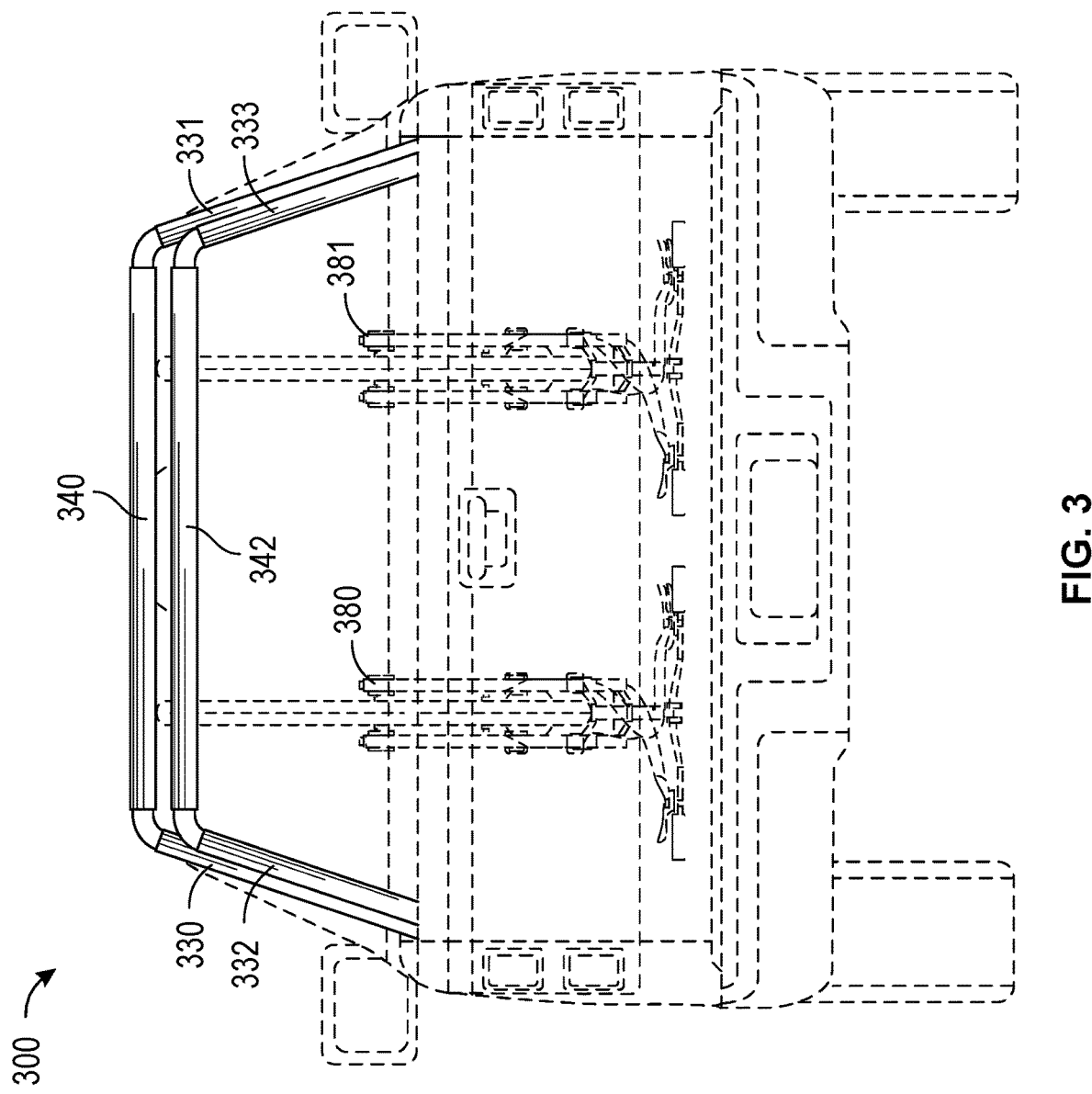
FIG. 3 illustrates an example pair of rack systems as per an aspect of various embodiments.

FIG. 3 illustrates an example pair of rack systems 300, mounted to a pickup truck, as per an aspect of various embodiments. A first rack system in the pair of rack systems may comprise a first support member 330 and a second support member 331. The first rack system may comprise a first cross-member 340. A second rack system in the pair of rack systems may comprise a third support member 332 and a forth support member 333. The second rack system may comprise a second cross-member 342. The first rack system and the second rack system may be structurally configured to secure, for example, at least one bicycle (380 and 381). The first rack system and the second rack system may each be structurally configured to secure, for example, a wheel of at least one bicycle. The first rack system and the second rack system may be structurally configured to adapt the height of the first cross-member 340 and the second cross-member 342 to secure, for example, a variety of bicycle sizes, bicycle shapes, and/or bicycle wheel sizes. The first rack system and the second rack system may be structurally configured to adapt the position of the first cross-member 340 and the second cross-member 342 to secure, for example, at least one bicycle (380 and 381) in a plurality of positions relative to a bed of the pickup truck.

Figure 4:
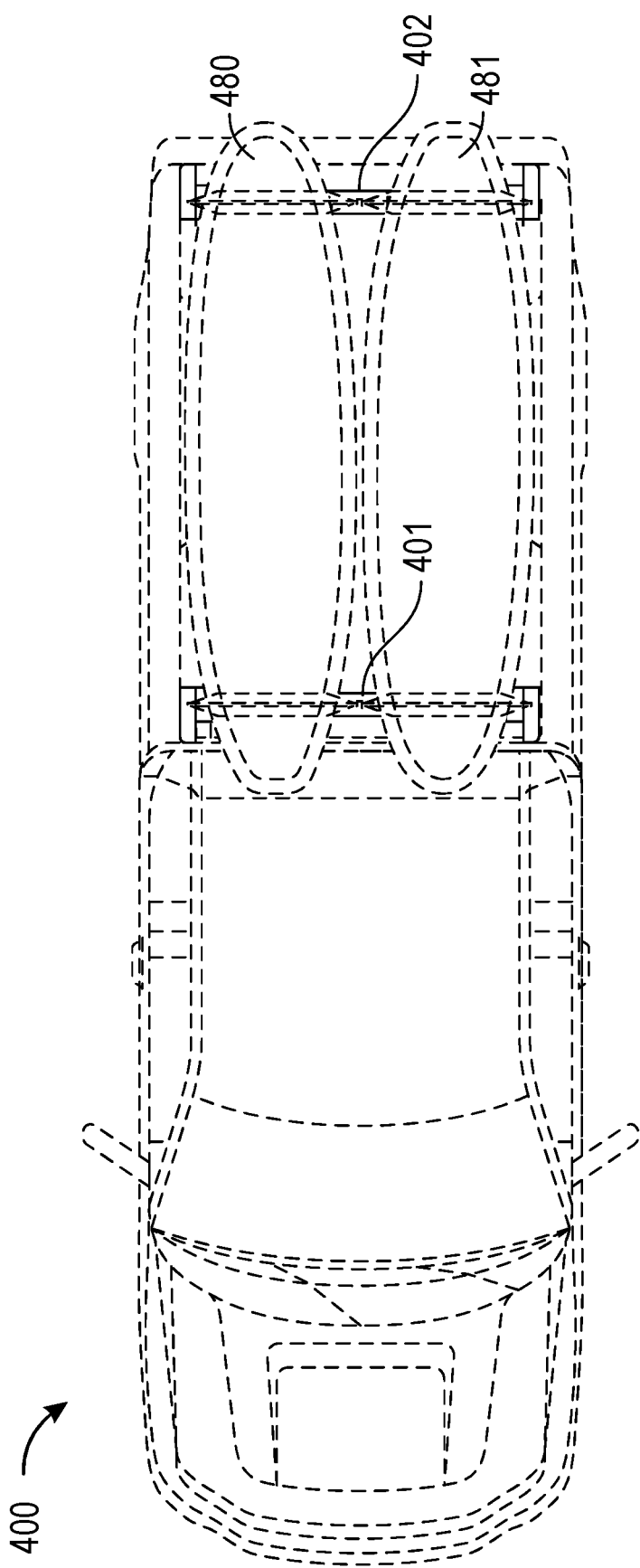
FIG. 4 illustrates an example pair of rack systems as per an aspect of various embodiments.

FIG. 4 illustrates an example pair of rack systems 400, mounted to a pickup truck, as per an aspect of various embodiments. The pair of rack systems may comprise a first rack system 401 and a second rack system 402. The first rack system 401 may comprise a first angle adjuster and a second angle adjuster. The first angle adjuster and the second angle adjuster may each be configured to lock at a first angle. The second rack system 402 may comprise a third angle adjuster and a fourth angle adjuster. The third angle adjuster and the fourth angle adjuster may each be configured to lock at the first angle. The first angle may position a cross-member of the first rack system 401 and a cross-member of the second rack system 402 higher than a cab of the pickup truck. The first rack system 401 and the second rack system 402 may be configured to support a load that is longer than the length of a bed of the pickup truck. The first rack system 401 and the second rack system 402 may be configured to secure, for example, at least one long board and/or standup paddle board (480 and 481).

Figure 5:
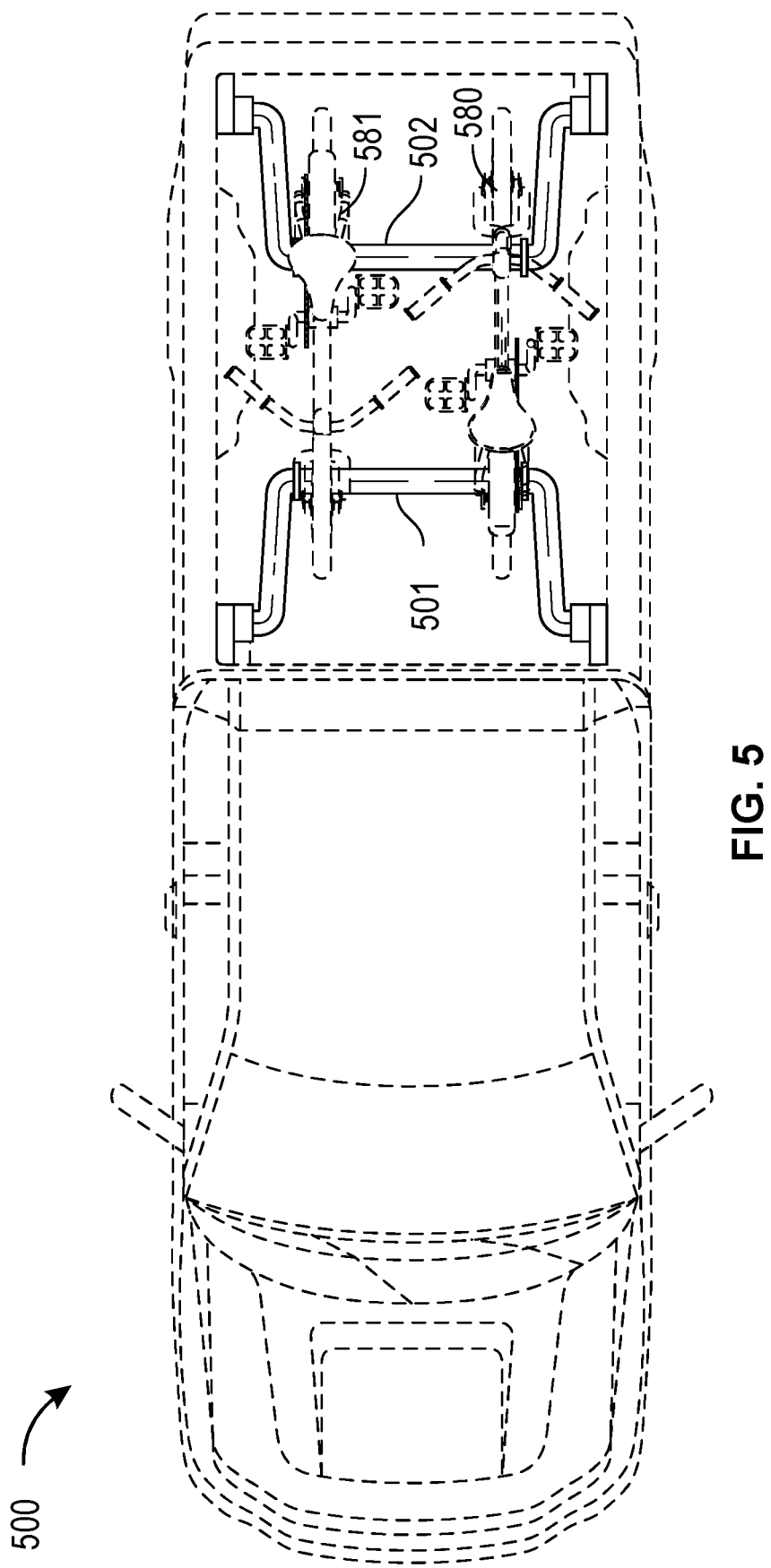
FIG. 5 illustrates an example pair of rack systems as per an aspect of various embodiments.

FIG. 5 illustrates an example pair of rack systems 500, mounted to a pickup truck, as per an aspect of various embodiments. The pair of rack systems may comprise a first rack system 501 and a second rack system 502. The first rack system 501 may comprise a first angle adjuster and a second angle adjuster. The first angle adjuster and the second angle adjuster may each be configured to lock at a second angle. The second rack system 502 may comprise a third angle adjuster and a fourth angle adjuster. The third angle adjuster and the fourth angle adjuster may each be configured to lock at the second angle. The second angle may position a cross-member of the first rack system 501 and a cross-member of the second rack system 502 lower than a first side wall and lower than a second side wall of a bed of the pickup truck. The first rack system 501 and the second rack system 502 may be configured to support a load that is shorter than the length of the bed. The first rack system 501 and the second rack system 502 may be configured to secure, for example, at least one bicycle (580 and 581).

According to an embodiment, a cross-member, a first support member, and a second support member may collectively comprise at least one rack accessory attachment feature. Rack accessories may be configured to secure a load. Examples of a load include but are not limited to bicycles, bicycle wheels, surf boards, paddle boards, canoes, kayaks, water skis, wake boards, snow skis, snow boards, lumber, ladders, spare tires, cargo baskets, vehicle recovery gear, combinations thereof, and/or the like. Rack accessories may comprise straps, tie downs, clamps, cradles, trays, combinations thereof, and/or the like. Examples of attachment features include but are not limited to holes, detents, grooves, and T-slots.

Figure 6:
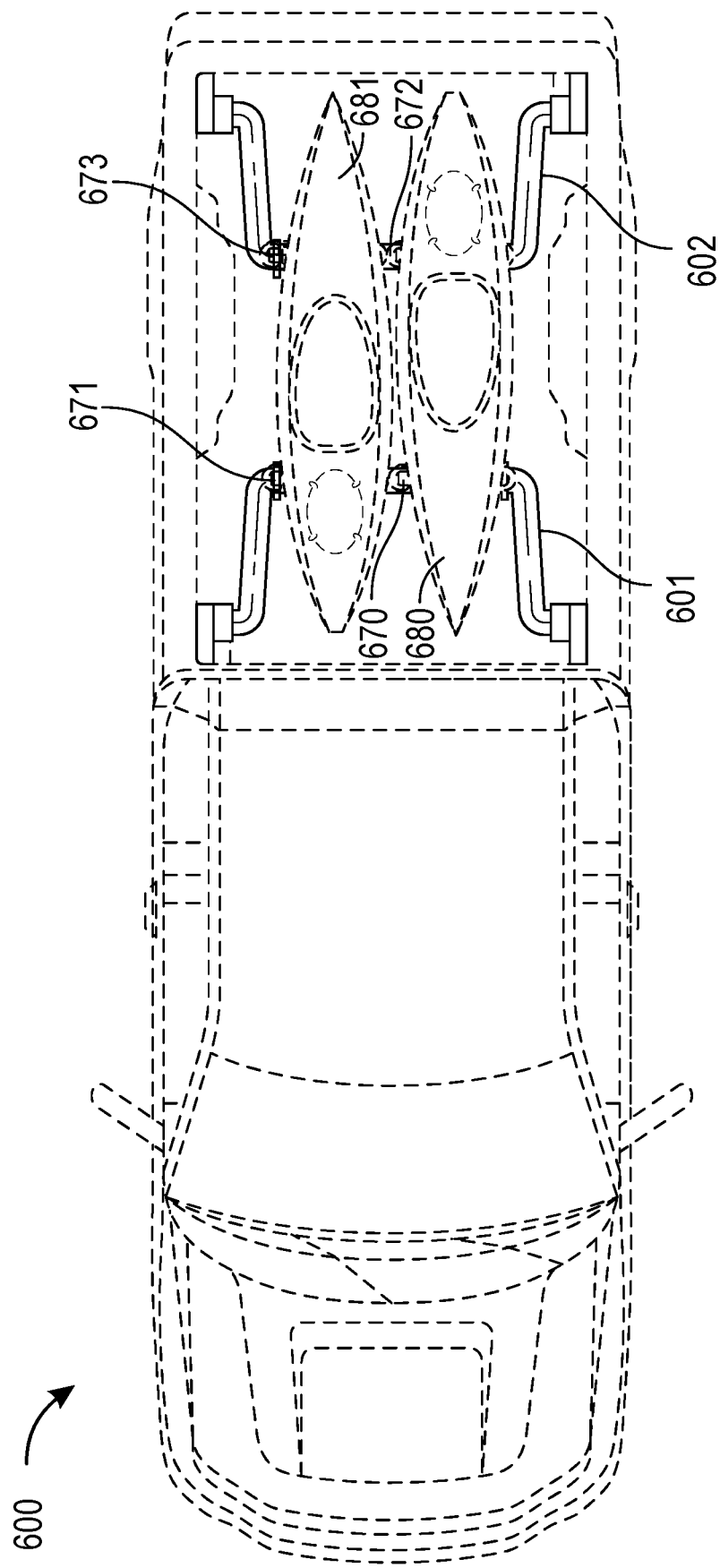
FIG. 6 illustrates an example pair of rack systems as per an aspect of various embodiments.

FIG. 6 illustrates an example pair of rack systems 600, mounted to a pickup truck, as per an aspect of various embodiments. The pair of rack systems may comprise a first rack system 601 and a second rack system 602. The first rack system 601 may comprise a first angle adjuster and a second angle adjuster. The first angle adjuster and the second angle adjuster may each be configured to lock at a second angle. The second rack system 602 may comprise a third angle adjuster and a fourth angle adjuster. The third angle adjuster and the fourth angle adjuster may each be configured to lock at the second angle. The second angle may position a cross-member of the first rack system 601 and a cross-member of the second rack system 602 lower than a first side wall and lower than a second side wall of a bed of the pickup truck. The first rack system 601 and the second rack system 602 may be configured to support a load that is shorter than the length of the bed. The first rack system 601 and the second rack system 602 may be configured to secure, for example, at least one kayak (680 and 681). The first rack system 601 and the second rack system 602 may be configured to accept at least one rack accessory (670, 671, 672, and 673). The at least one rack accessory (670, 671, 672, and 673) may comprise at least one cradle configured to secure the at least one kayak (680 and 681).

Figure 7:
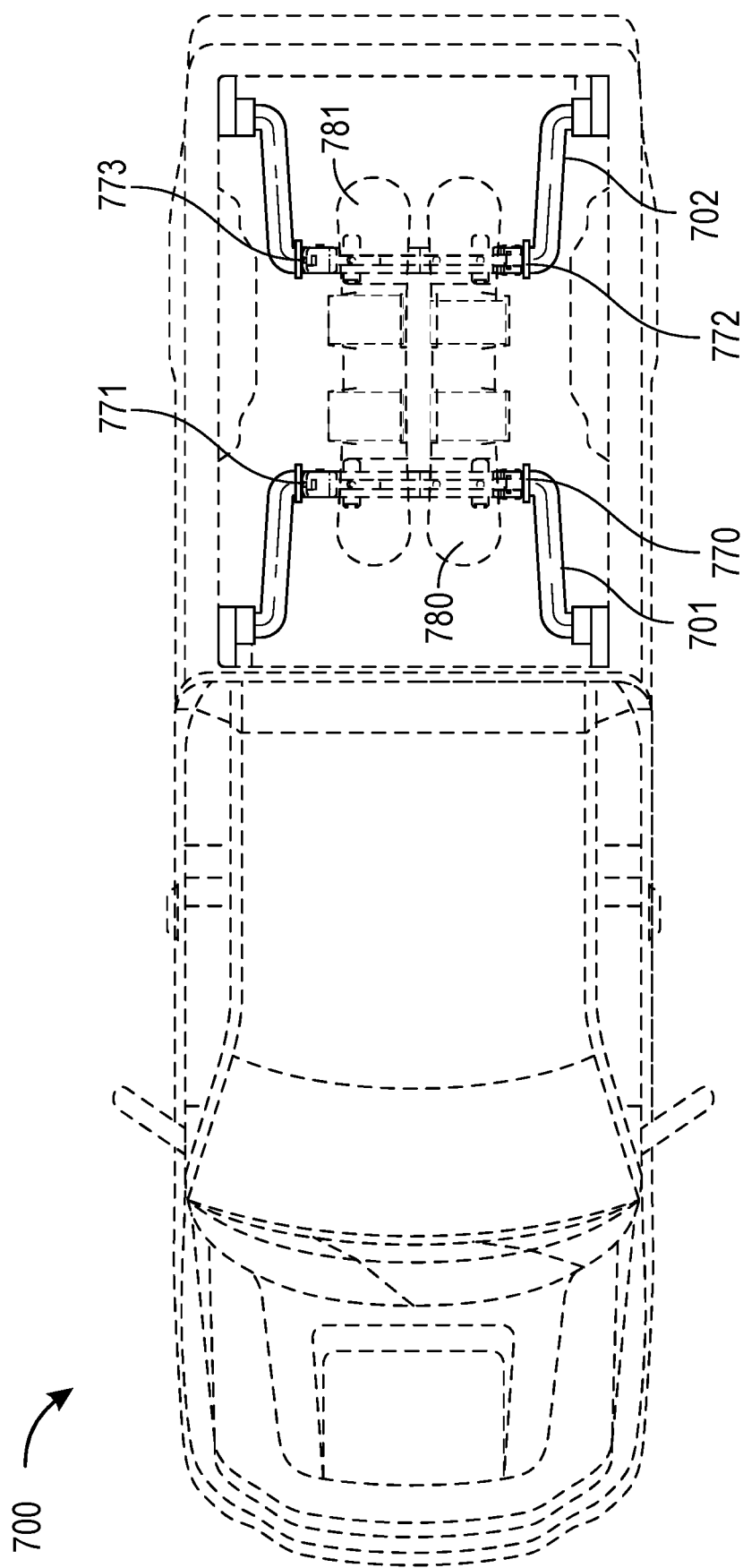
FIG. 7 illustrates an example pair of rack systems as per an aspect of various embodiments.

FIG. 7 illustrates an example pair of rack systems 700, mounted to a pickup truck, as per an aspect of various embodiments. The pair of rack systems may comprise a first rack system 701 and a second rack system 702. The first rack system 701 may comprise a first angle adjuster and a second angle adjuster. The first angle adjuster and the second angle adjuster may each be configured to lock at a second angle. The second rack system 702 may comprise a third angle adjuster and a fourth angle adjuster. The third angle adjuster and the fourth angle adjuster may each be configured to lock at the second angle. The second angle may position a cross-member of the first rack system 701 and a cross-member of the second rack system 702 lower than a first side wall and lower than a second side wall of a bed of the pickup truck. The first rack system 701 and the second rack system 702 may be configured to support a load that is shorter than the length of the bed. The first rack system 701 and the second rack system 702 may be configured to secure, for example, at least one pair of snow skis and/or at least one snow board (780 and 781). The first rack system 701 and the second rack system 702 may be configured to accept at least one rack accessory (770, 771, 772, and 773). The at least one rack accessory (770, 771, 772, and 773) may comprise at least one clamp configured to secure the at least one snow board (780 and 781).

Figure 8:
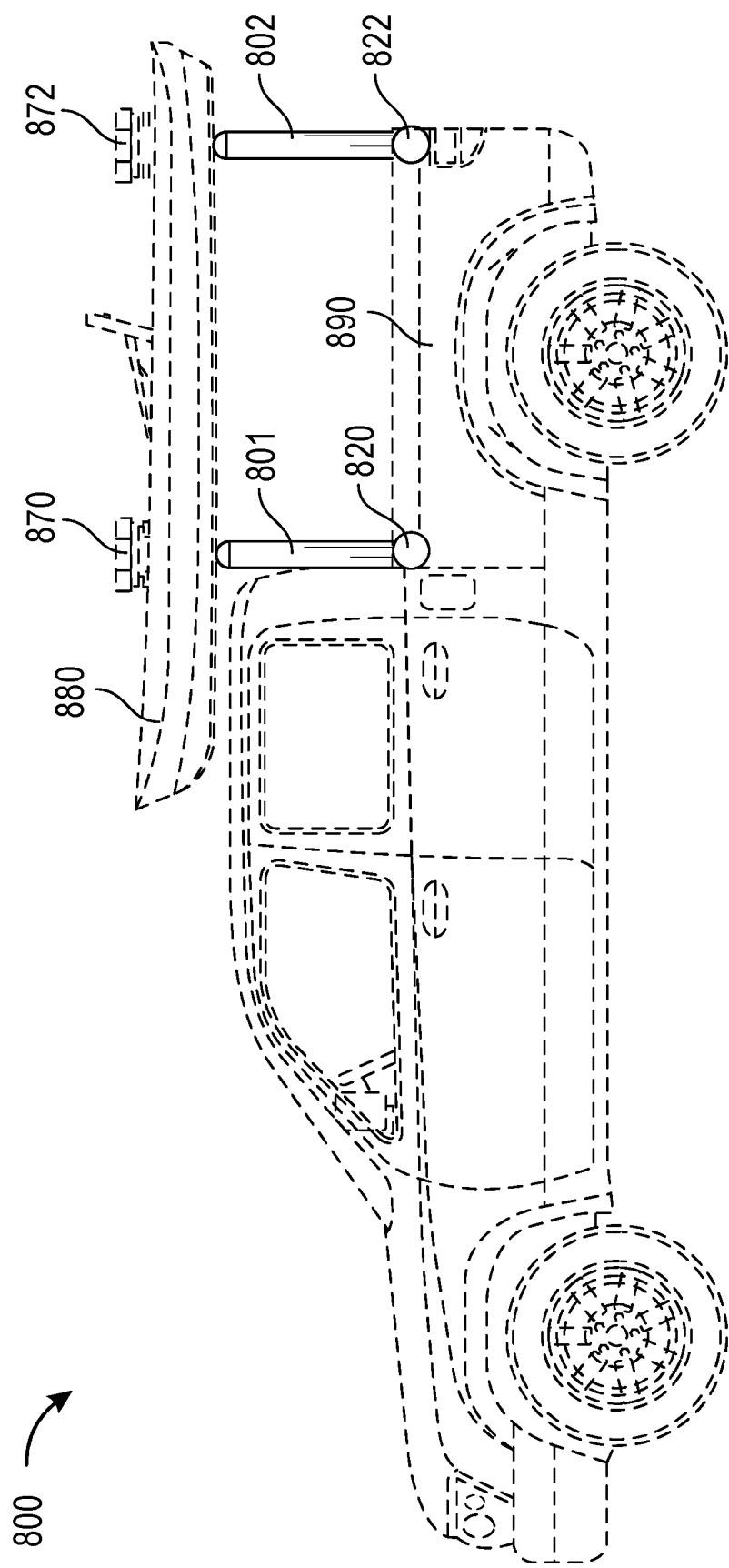
FIG. 8 illustrates an example pair of rack systems as per an aspect of various embodiments.

FIG. 8 illustrates an example pair of rack systems 800, mounted to a pickup truck, as per an aspect of various embodiments. The pair of rack systems may comprise a first rack system 801 and a second rack system 802. The first rack system 801 may comprise a first anchor and adjuster assembly 820 and a second anchor and adjuster assembly (not shown). The first anchor and adjuster assembly 820 may comprise a first anchor and a first angle adjuster. The first anchor may be structurally configured to connect to a first side wall 890. The second anchor and adjuster assembly may comprise a second anchor and a second angle adjuster. The first angle adjuster and the second angle adjuster may each be configured to lock at a first angle. The second rack system 802 may comprise a third anchor and adjuster assembly 822 and a fourth anchor and adjuster assembly (not shown). The third anchor and adjuster assembly 822 may comprise a third anchor and a third angle adjuster. The third anchor may be structurally configured to connect to the first side wall 890. The fourth anchor and adjuster assembly may comprise a fourth anchor and a fourth angle adjuster. The third angle adjuster and the fourth angle adjuster may each be configured to lock at the first angle. The first angle may position a cross-member of the first rack system 801 and a cross-member of the second rack system 802 higher than a cab of the pickup truck. The first rack system 801 and the second rack system 802 may be configured to support a load that is longer than the length of a bed of the pickup truck. The first rack system 801 and the second rack system 802 may be configured to secure, for example, at least one sit-on-top kayak 880. The first rack system 801 and the second rack system 802 may be configured to accept at least one rack accessory (870 and 872). The at least one rack accessory (870 and 872) may comprise at least one cradle configured to secure the at least one sit-on-top kayak 880.

Figure 9:
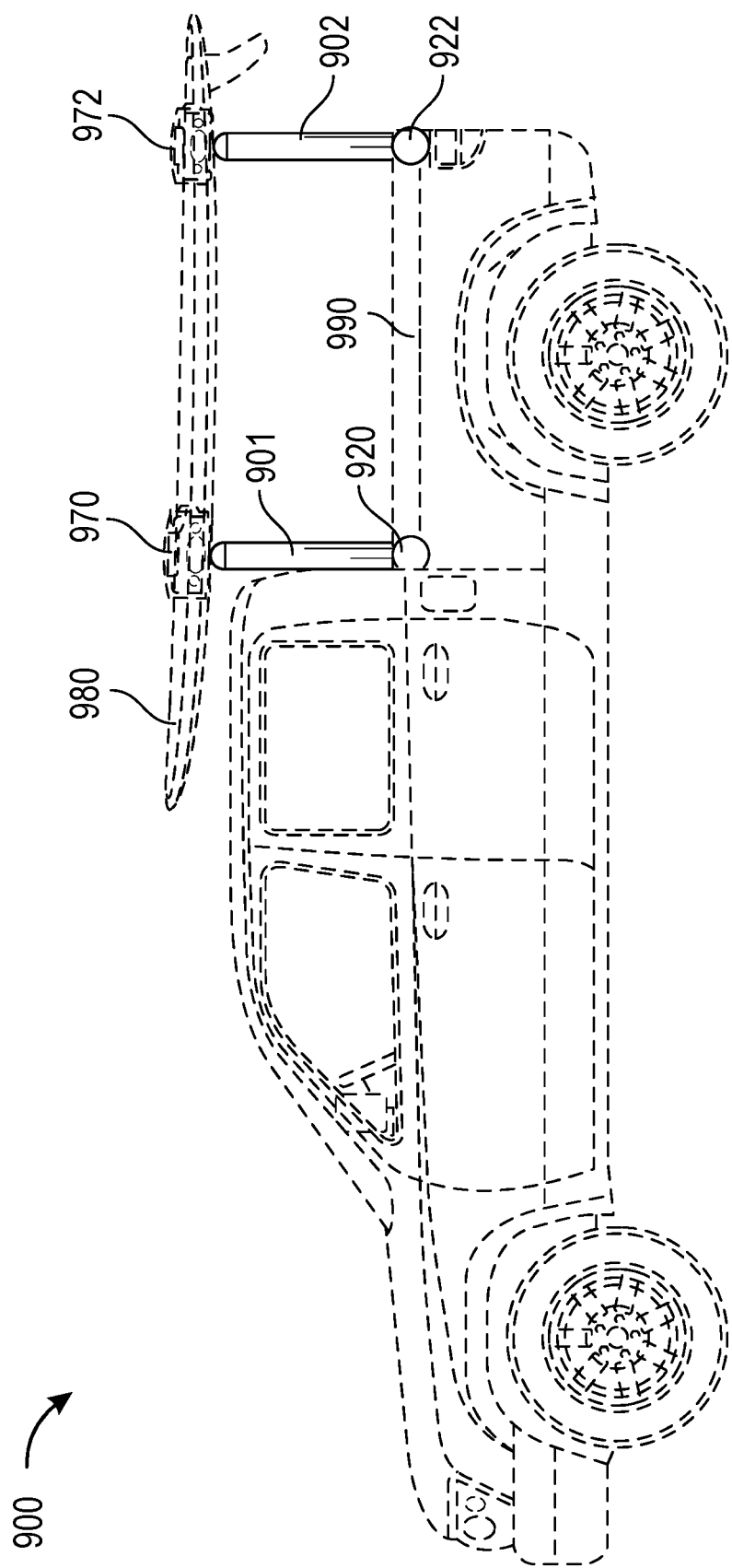
FIG. 9 illustrates an example pair of rack systems as per an aspect of various embodiments.

FIG. 9 illustrates an example pair of rack systems 900, mounted to a pickup truck, as per an aspect of various embodiments. The pair of rack systems may comprise a first rack system 901 and a second rack system 902. The first rack system 901 may comprise a first anchor and adjuster assembly 920 and a second anchor and adjuster assembly (not shown). The first anchor and adjuster assembly 920 may comprise a first anchor and a first angle adjuster. The first anchor may be structurally configured to connect to a first side wall 990. The second anchor and adjuster assembly may comprise a second anchor and a second angle adjuster. The first angle adjuster and the second angle adjuster may each be configured to lock at a first angle. The second rack system 902 may comprise a third anchor and adjuster assembly 922 and a fourth anchor and adjuster assembly (not shown). The third anchor and adjuster assembly 922 may comprise a third anchor and a third angle adjuster. The third anchor may be structurally configured to connect to the first side wall 990. The fourth anchor and adjuster assembly may comprise a fourth anchor and a fourth angle adjuster. The third angle adjuster and the fourth angle adjuster may each be configured to lock at the first angle. The first angle may position a cross-member of the first rack system 901 and a cross-member of the second rack system 902 higher than a cab of the pickup truck. The first rack system 901 and the second rack system 902 may be configured to support a load that is longer than the length of a bed of the pickup truck. The first rack system 901 and the second rack system 902 may be configured to secure, for example, at least one long board and/or standup paddle board 980. The first rack system 901 and the second rack system 902 may be configured to accept at least one rack accessory (970 and 972). The at least one rack accessory (970 and 972) may comprise at least one clamp configured to secure the at least one long board and/or standup paddle board 980.

Figure 10:
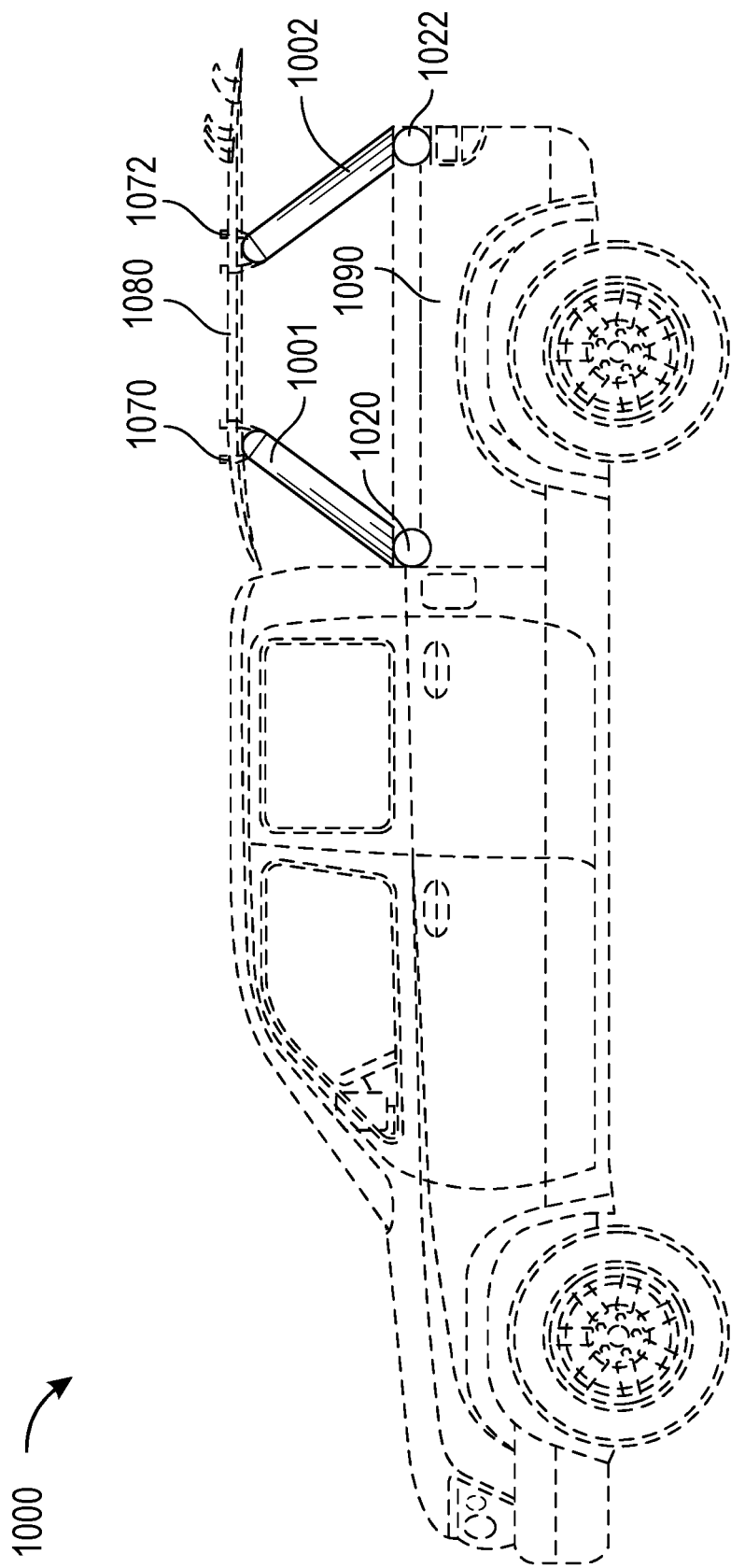
FIG. 10 illustrates an example pair of rack systems as per an aspect of various embodiments.

FIG. 10 illustrates an example pair of rack systems 1000, mounted to a pickup truck, as per an aspect of various embodiments. The pair of rack systems may comprise a first rack system 1001 and a second rack system 1002. The first rack system 1001 may comprise a first anchor and adjuster assembly 1020 and a second anchor and adjuster assembly (not shown). The first anchor and adjuster assembly 1020 may comprise a first anchor and a first angle adjuster. The first anchor may be structurally configured to connect to a first side wall 1090. The second anchor and adjuster assembly may comprise a second anchor and a second angle adjuster. The first angle adjuster and the second angle adjuster may each be configured to lock at a third angle. The second rack system 1002 may comprise a third anchor and adjuster assembly 1022 and a fourth anchor and adjuster assembly (not shown). The third anchor and adjuster assembly 1022 may comprise a third anchor and a third angle adjuster. The third anchor may be structurally configured to connect to the first side wall 1090. The fourth anchor and adjuster assembly may comprise a fourth anchor and a fourth angle adjuster. The third angle adjuster and the fourth angle adjuster may each be configured to lock at the third angle. The third angle may position a cross-member of the first rack system 1001 and a cross-member of the second rack system 1002 lower than a cab height of the pickup truck and higher than the first side wall 1090. The first rack system 1001 and the second rack system 1002 may be configured to support a load that is shorter than the length of a bed of the pickup truck. The first rack system 1001 and the second rack system 1002 may be configured to secure, for example, at least one surf board 1080. The first rack system 1001 and the second rack system 1002 may be configured to accept at least one rack accessory (1070 and 1072). The at least one rack accessory (1070 and 1072) may comprise at least one strap configured to secure the at least one surf board 1080.

Figure 11:
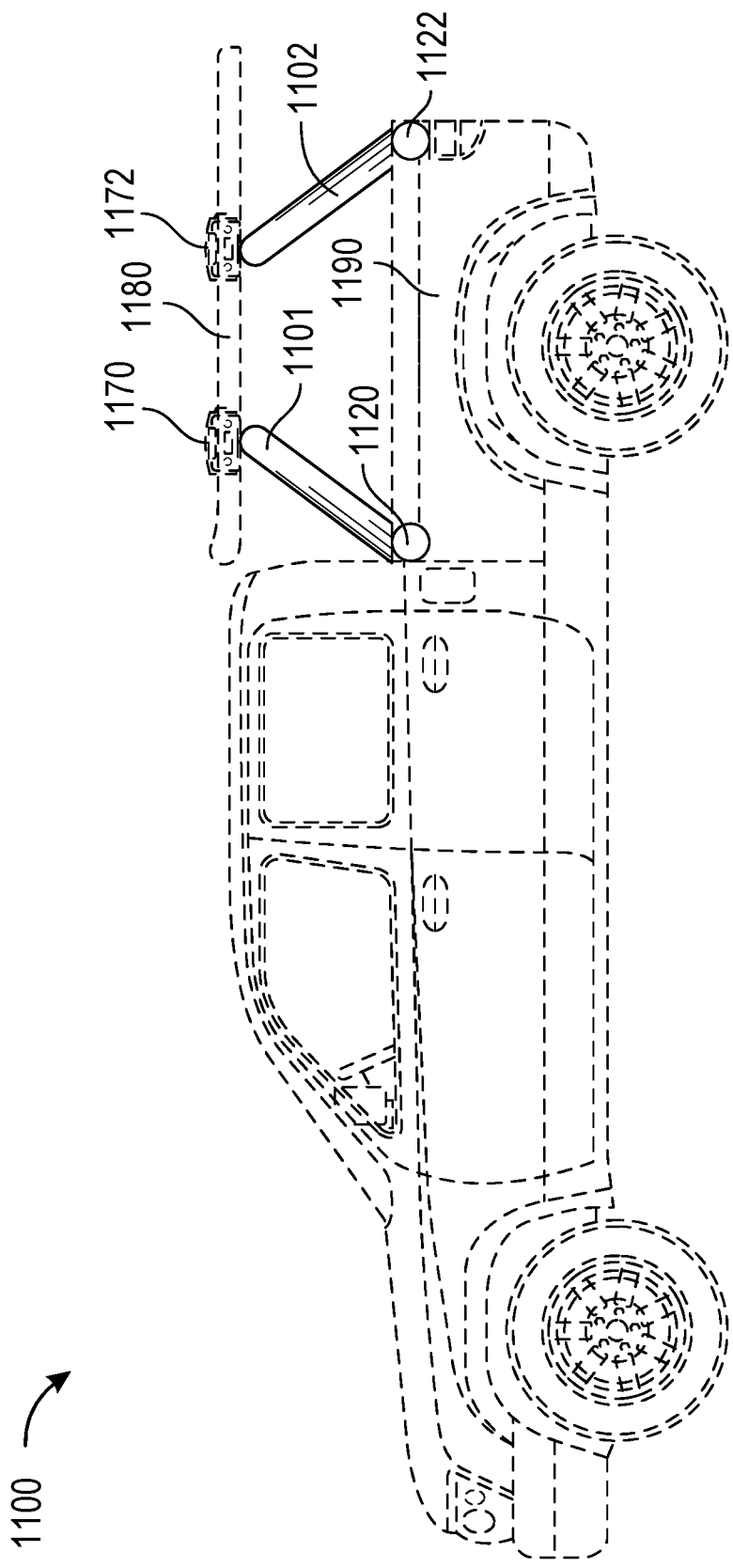
FIG. 11 illustrates an example pair of rack systems as per an aspect of various embodiments.

FIG. 11 illustrates an example pair of rack systems 1100, mounted to a pickup truck, as per an aspect of various embodiments. The pair of rack systems may comprise a first rack system 1101 and a second rack system 1102. The first rack system 1101 may comprise a first anchor and adjuster assembly 1120 and a second anchor and adjuster assembly (not shown). The first anchor and adjuster assembly 1120 may comprise a first anchor and a first angle adjuster. The first anchor may be structurally configured to connect to a first side wall 1190. The second anchor and adjuster assembly may comprise a second anchor and a second angle adjuster. The first angle adjuster and the second angle adjuster may each be configured to lock at a third angle. The second rack system 1102 may comprise a third anchor and adjuster assembly 1122 and a fourth anchor and adjuster assembly (not shown). The third anchor and adjuster assembly 1122 may comprise a third anchor and a third angle adjuster. The third anchor may be structurally configured to connect to the first side wall 1190. The fourth anchor and adjuster assembly may comprise a fourth anchor and a fourth angle adjuster. The third angle adjuster and the fourth angle adjuster may each be configured to lock at the third angle. The third angle may position a cross-member of the first rack system 1101 and a cross-member of the second rack system 1102 lower than a cab height of the pickup truck and higher than the first side wall 1190. The first rack system 1101 and the second rack system 1102 may be configured to support a load that is shorter than the length of a bed of the pickup truck. The first rack system 1101 and the second rack system 1102 may be configured to secure, for example, at least one pair of snow skis 1180. The first rack system 1101 and the second rack system 1102 may be configured to accept at least one rack accessory (1170 and 1172). The at least one rack accessory (1170 and 1172) may comprise at least one cradle configured to secure the at least one pair of snow skis 1180.

Figure 12:
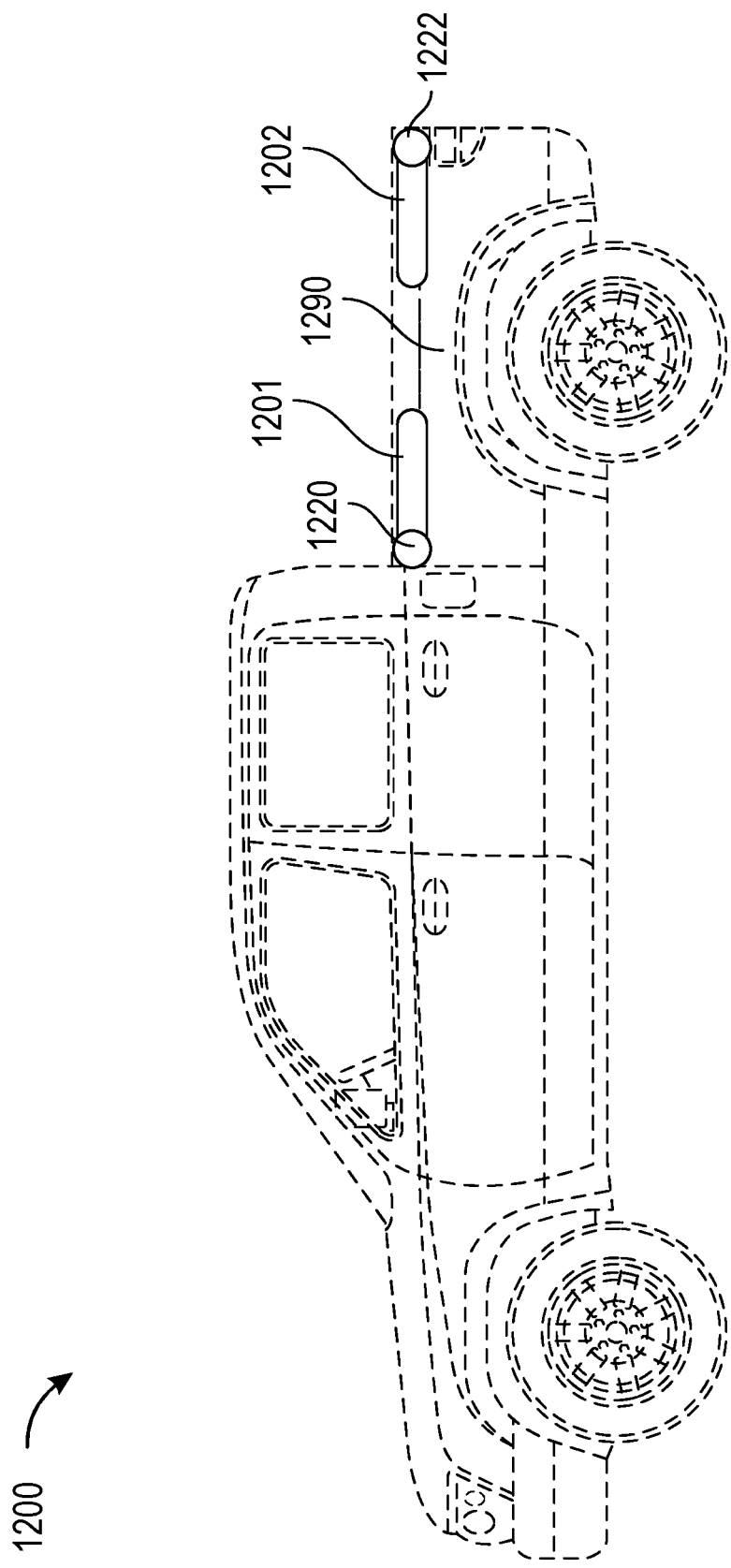
FIG. 12 illustrates an example pair of rack systems as per an aspect of various embodiments.

FIG. 12 illustrates an example pair of rack systems 1200, mounted to a pickup truck, as per an aspect of various embodiments. The pair of rack systems may comprise a first rack system 1201 and a second rack system 1202. The first rack system 1201 may comprise a first anchor and adjuster assembly 1220 and a second anchor and adjuster assembly (not shown). The first anchor and adjuster assembly 1220 may comprise a first anchor and a first angle adjuster. The first anchor may be structurally configured to connect to a first side wall 1290. The second anchor and adjuster assembly may comprise a second anchor and a second angle adjuster. The first angle adjuster and the second angle adjuster may each be configured to lock at a second angle. The second rack system 1202 may comprise a third anchor and adjuster assembly 1222 and a fourth anchor and adjuster assembly (not shown). The third anchor and adjuster assembly 1222 may comprise a third anchor and a third angle adjuster. The third anchor may be structurally configured to connect to the first side wall 1290. The fourth anchor and adjuster assembly may comprise a fourth anchor and a fourth angle adjuster. The third angle adjuster and the fourth angle adjuster may each be configured to lock at the second angle. The second angle may position a cross-member of the first rack system 1201 and a cross-member of the second rack system 1202 lower than the first side wall 1290. In this position, the first rack system 1201 and the second rack system 1202 may be configured to support a load that is shorter than the length of a bed of the pickup truck. In this position, the first rack system 1201 and the second rack system 1202 may be configured to support a load that is longer than the length of a bed of the pickup truck when a tailgate of the pickup truck is in an open position. In this position, an optional tonneau cover configured to contact the top of the first side wall 1290 and the top of a second side wall (not shown), may close over the first rack system 1201 and/or the second rack system 1202. The optional tonneau cover may be configured to cover at least a portion of the bed.

Figure 13:
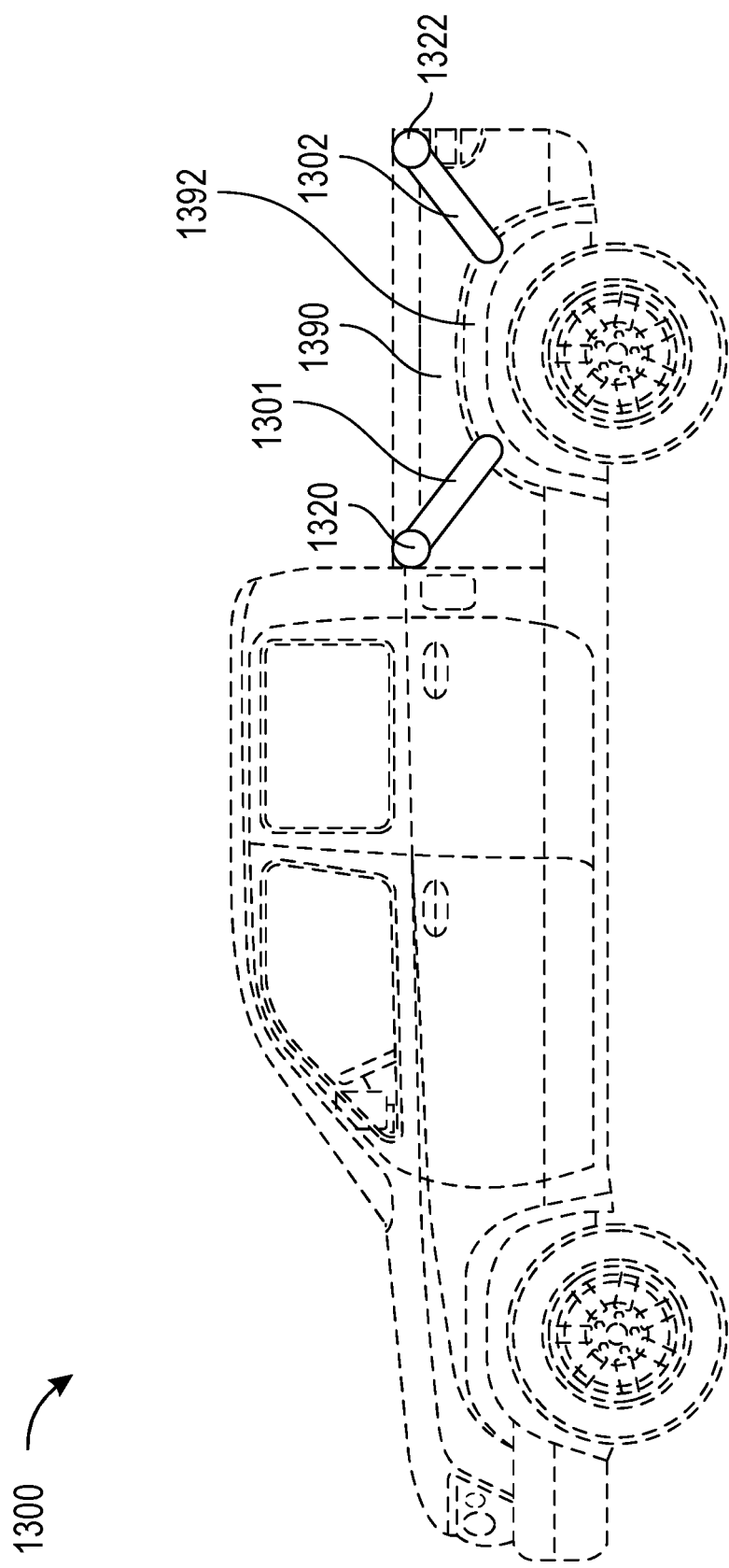
FIG. 13 illustrates an example pair of rack systems as per an aspect of various embodiments.

FIG. 13 illustrates an example pair of rack systems 1300, mounted to a pickup truck, as per an aspect of various embodiments. The pair of rack systems may comprise a first rack system 1301 and a second rack system 1302. The first rack system 1301 may comprise a first anchor and adjuster assembly 1320 and a second anchor and adjuster assembly (not shown). The first anchor and adjuster assembly 1320 may comprise a first anchor and a first angle adjuster. The first anchor may be structurally configured to connect to a first side wall 1390. The second anchor and adjuster assembly may comprise a second anchor and a second angle adjuster. The first angle adjuster and the second angle adjuster may each be configured to lock at a forth angle. The second rack system 1302 may comprise a third anchor and adjuster assembly 1322 and a fourth anchor and adjuster assembly (not shown). The third anchor and adjuster assembly 1322 may comprise a third anchor and a third angle adjuster. The third anchor may be structurally configured to connect to the first side wall 1390. The fourth anchor and adjuster assembly may comprise a fourth anchor and a fourth angle adjuster. The third angle adjuster and the fourth angle adjuster may each be configured to lock at the forth angle. The forth angle may position a cross-member of the first rack system 1301 and a cross-member of the second rack system 1302 lower than a top of a first wheel well 1392. The forth angle may prevent a cross-member of the first rack system 1301 and a cross-member of the second rack system 1302 from contacting a floor of a bed of the pickup truck. In this position, the first rack system 1301 and the second rack system 1302 may be configured to support a load that is shorter than the length of the bed. In this position, the first rack system 1301 and the second rack system 1302 may be configured to support a load that is longer than the length of a bed of the pickup truck when a tailgate of the pickup truck is in an open position. In this position, an optional tonneau cover configured to contact the top of the first side wall 1390 and the top of a second side wall (not shown), may close over the first rack system 1301 and/or the second rack system 1302. The optional tonneau cover may be configured to cover at least a portion of the bed.

Figure 14:
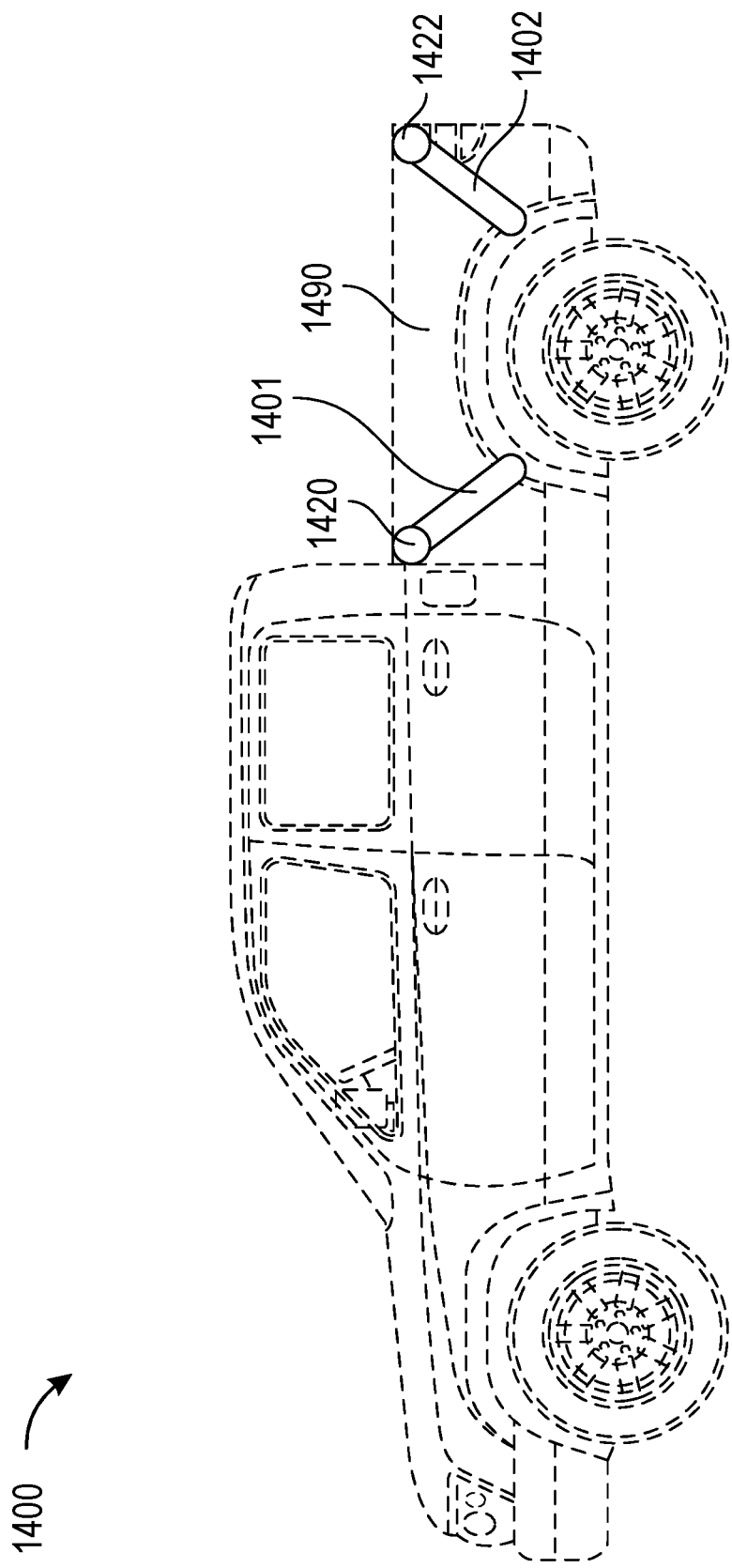
FIG. 14 illustrates an example pair of rack systems as per an aspect of various embodiments.

FIG. 14 illustrates an example pair of rack systems 1400, mounted to a pickup truck, as per an aspect of various embodiments. The pair of rack systems may comprise a first rack system 1401 and a second rack system 1402. The first rack system 1401 may comprise a first anchor and adjuster assembly 1420 and a second anchor and adjuster assembly (not shown). The first anchor and adjuster assembly 1420 may comprise a first anchor and a first angle adjuster. The first anchor may be structurally configured to connect to a first side wall 1490. The second anchor and adjuster assembly may comprise a second anchor and a second angle adjuster. The first angle adjuster and the second angle adjuster may each be configured to lock at a fifth angle. The second rack system 1402 may comprise a third anchor and adjuster assembly 1422 and a fourth anchor and adjuster assembly (not shown). The third anchor and adjuster assembly 1422 may comprise a third anchor and a third angle adjuster. The third anchor may be structurally configured to connect to the first side wall 1490. The fourth anchor and adjuster assembly may comprise a fourth anchor and a fourth angle adjuster. The third angle adjuster and the fourth angle adjuster may each be configured to lock at the fifth angle. The fifth angle may position a cross-member of the first rack system 1401 and a cross-member of the second rack system 1402 in contact with a floor of a bed of the pickup truck. In this position, the first rack system 1401 and the second rack system 1402 may be configured to support a load that is shorter than the length of the bed. In this position, the first rack system 1401 and the second rack system 1402 may be configured to support a load that is longer than the length of a bed of the pickup truck when a tailgate of the pickup truck is in an open position. In this position, an optional tonneau cover configured to contact the top of the first side wall 1490 and the top of a second side wall (not shown), may close over the first rack system 1401 and/or the second rack system 1402. The optional tonneau cover may be configured to cover at least a portion of the bed.

According to an embodiment, a first anchor may comprise a first suction cup. A second anchor may comprise a second suction cup. The first suction cup may be structurally configured to attach to a first side wall of, for example, a bed of a pickup truck. The second suction cup may be structurally configured to attach to a second side wall.

According to an embodiment, a first anchor may comprise a first magnet. A second anchor may comprise a second magnet. The first magnet may be structurally configured to attach to a first side wall of, for example, a bed of a pickup truck. The second magnet may be structurally configured to attach to a second side wall.

According to an embodiment, a first anchor may be structurally configured to be fastened to a first side wall of, for example, a bed of a pickup truck. A second anchor may be structurally configured to be fastened to a second side wall.

According to an embodiment, an angle adjuster may comprise at least one bearing support member. Each of the at least one bearing support member may be structurally configured to support an inner race of at least one bearing. The angle adjuster may comprise an inner tube. The inner tube may comprise a first outer surface. The inner tube may comprise a first inner surface. The first inner surface may be structurally configured to be at least partially supported by an outer race of the at least one bearing. The angle adjuster may comprise an outer tube. The outer tube may comprise a second outer surface. The outer tube may comprise a second inner surface. The second inner surface may be structurally configured to be at least partially supported by the first outer surface. The angle adjuster may be structurally configured to adjust to a plurality of lengths. A rack system comprising the angle adjuster may therefore be structurally configured to adjust to a plurality of pickup truck bed widths.

According to an embodiment, a first angle adjuster and a second angle adjuster may each comprise a series of holes in an inner tube. The first angle adjuster and the second angle adjuster may each comprise at least one alignment hole in an outer tube. Alignment of the at least one alignment hole with a first of the series of holes may correspond to a first angle. Alignment of the at least one alignment hole with a second of the series of holes may correspond to a second angle. Alignment of the at least one alignment hole with a third of the series of holes may correspond to a third angle. Alignment of the at least one alignment hole with a fourth of the series of holes may correspond to a fourth angle. Alignment of the at least one alignment hole with a fifth of the series of holes may correspond to a fifth angle. Alignment of the at least one alignment hole with a sixth of the series of holes may correspond to a sixth angle. The series of holes and the at least one alignment hole may be structurally configured to receive a hitch pin, a cotter pin, at least one spring loaded pin, a quick disconnect pin, combinations thereof, and/or the like. The at least one spring loaded pin may collectively connect to an inner surface of the inner tube and an outer surface of the outer tube. The hitch pin, cotter pin, at least one spring loaded pin, quick disconnect pin, combinations thereof, and/or the like may be employed as a locking mechanism.

According to an embodiment, a first angle adjuster and a second angle adjuster may each comprise a series of holes in an outer tube. The first angle adjuster and the second angle adjuster may each comprise at least one alignment hole in an inner tube. Alignment of the at least one alignment hole with a first of the series of holes may correspond to a first angle. Alignment of the at least one alignment hole with a second of the series of holes may correspond to a second angle. Alignment of the at least one alignment hole with a third of the series of holes may correspond to a third angle. Alignment of the at least one alignment hole with a fourth of the series of holes may correspond to a fourth angle. Alignment of the at least one alignment hole with a fifth of the series of holes may correspond to a fifth angle. Alignment of the at least one alignment hole with a sixth of the series of holes may correspond to a sixth angle. The series of holes and the at least one alignment hole may be structurally configured to receive a hitch pin, a cotter pin, at least one spring loaded pin, combinations thereof, and/or the like. The at least one spring loaded pin may collectively connect to an outer surface of the outer tube and an inner surface of the inner tube. The hitch pin, cotter pin, at least one spring loaded pin, quick disconnect pin, combinations thereof, and/or the like may be employed as a locking mechanism.

Figure 15A:
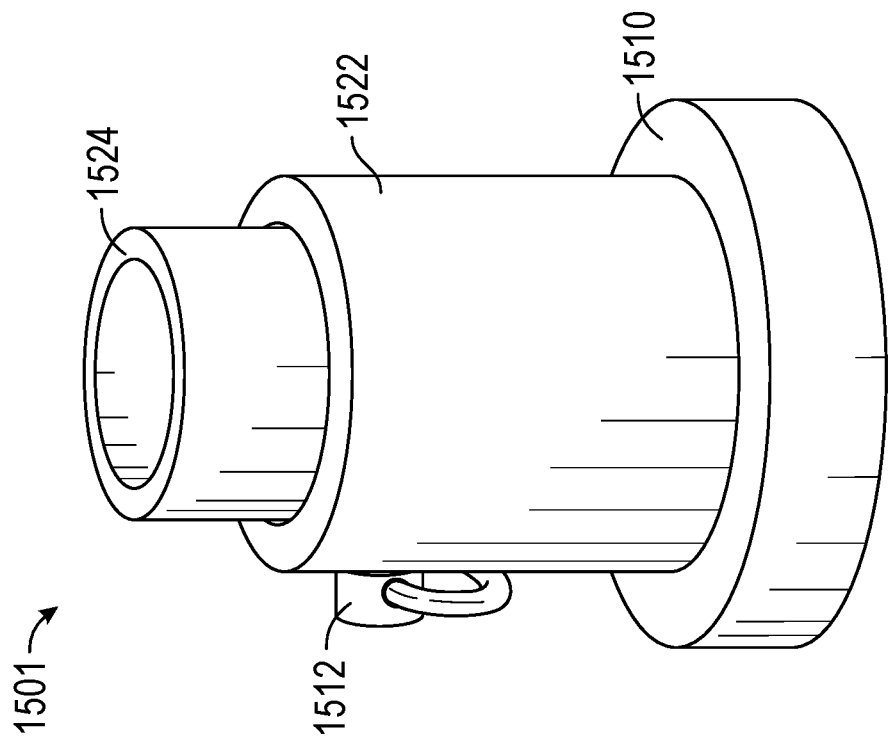
FIG. 15A illustrates an example anchor and angle adjuster assembly as per an aspect of various embodiments.

FIG. 15A illustrates an example anchor and angle adjuster assembly 1500 as per an aspect of various embodiments. The anchor and angle adjuster assembly 1500 may comprise an anchor 1510. The anchor 1510 may comprise a magnet. The anchor and angle adjuster assembly 1500 may comprise an angle adjuster. The angle adjuster may comprise an outer tube 1522. The angle adjuster may comprise an inner tube 1524. The outer tube 1522 and inner tube 1524 may be constructed from a variety of materials including plastic, metal, metal alloy, fiberglass, carbon fiber, combinations thereof, and/or the like. The anchor and angle adjuster assembly 1500 may comprise a quick disconnect pin 1512.

Figure 15B:
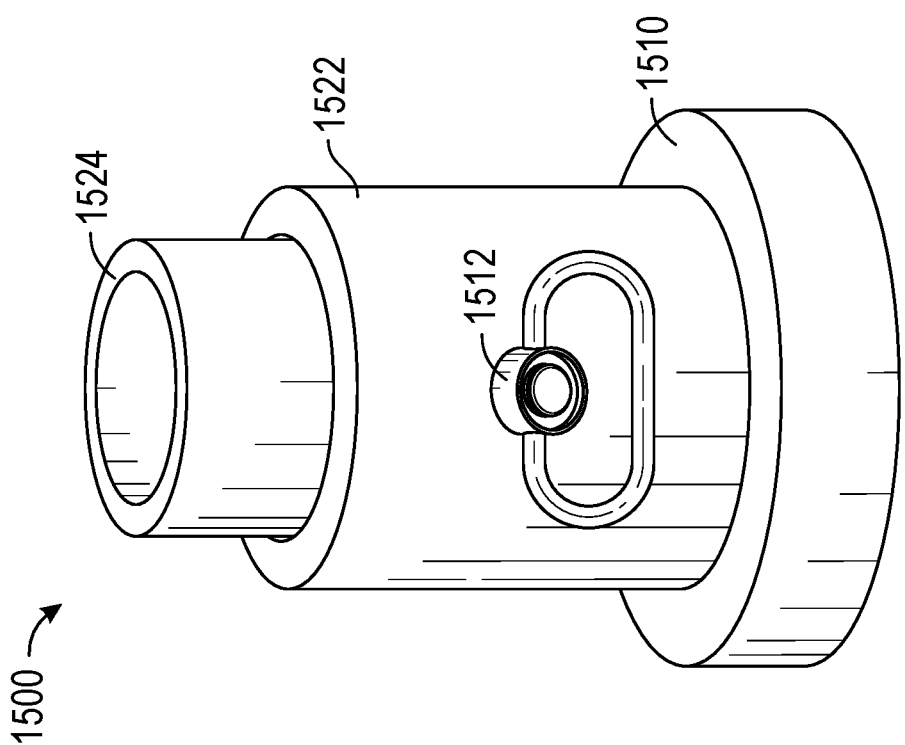
FIG. 15B illustrates an example anchor and angle adjuster assembly as per an aspect of various embodiments.

FIG. 15B illustrates an example anchor and angle adjuster assembly 1501 as per an aspect of various embodiments. The anchor and angle adjuster assembly 1501 may comprise an anchor 1510. The anchor 1510 may comprise a magnet. The anchor and angle adjuster assembly 1501 may comprise an angle adjuster. The angle adjuster may comprise an outer tube 1522. The angle adjuster may comprise an inner tube 1524. The outer tube 1522 and inner tube 1524 may be constructed from a variety of materials including plastic, metal, metal alloy, fiberglass, carbon fiber, combinations thereof, and/or the like. The anchor and angle adjuster assembly 1501 may comprise a quick disconnect pin 1512.

Figure 16A:
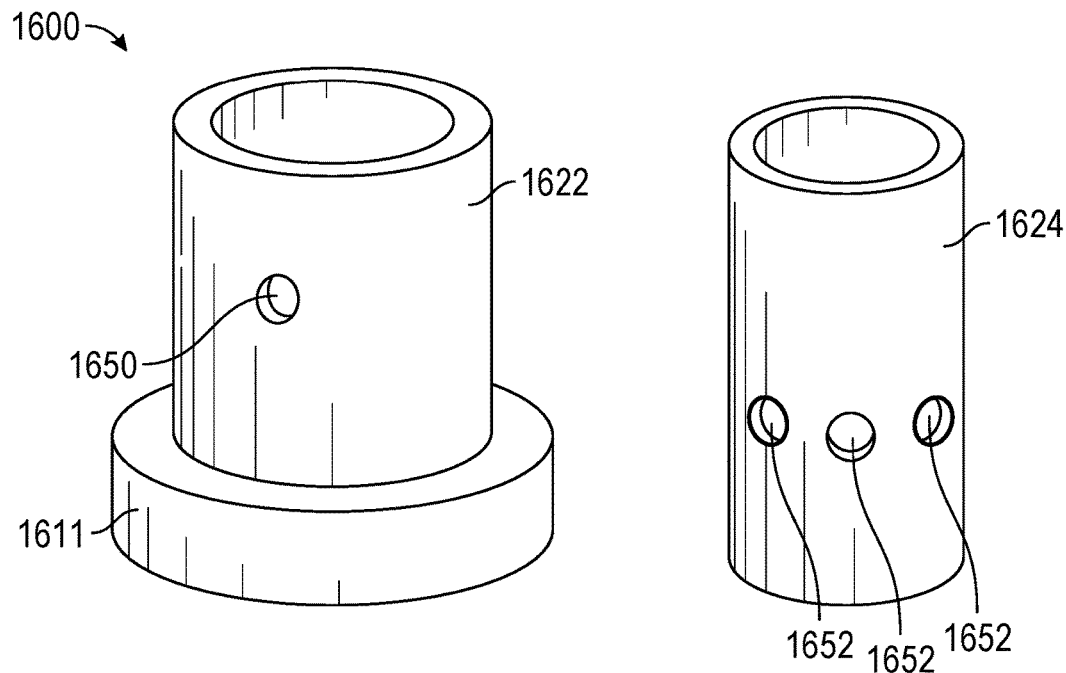
FIG. 16A illustrates an example anchor and angle adjuster assembly as per an aspect of various embodiments.

FIG. 16A illustrates an example anchor and angle adjuster assembly 1600 as per an aspect of various embodiments. The anchor and angle adjuster assembly 1600 may comprise an anchor housing 1611. The anchor housing 1611 may be configured to house an anchor. The anchor and angle adjuster assembly 1600 may comprise an angle adjuster. The angle adjuster may comprise an outer tube 1622. The outer tube 1622 may comprise at least one alignment hole 1650. The angle adjuster may comprise an inner tube 1624. For example, the inner tube 1624 may comprise an outer diameter of 2.375 inches. For example, the inner tube 1624 may comprise an inner diameter of 2.05 inches. The inner tube 1624 may comprise a series of holes 1652. The dimensions disclosed in this example are meant to show relation between the dimensions. Persons skilled in the art will recognize that some or all of the dimensions may be changed to support other tube dimensions and/or bearing dimensions.

Figure 16B:
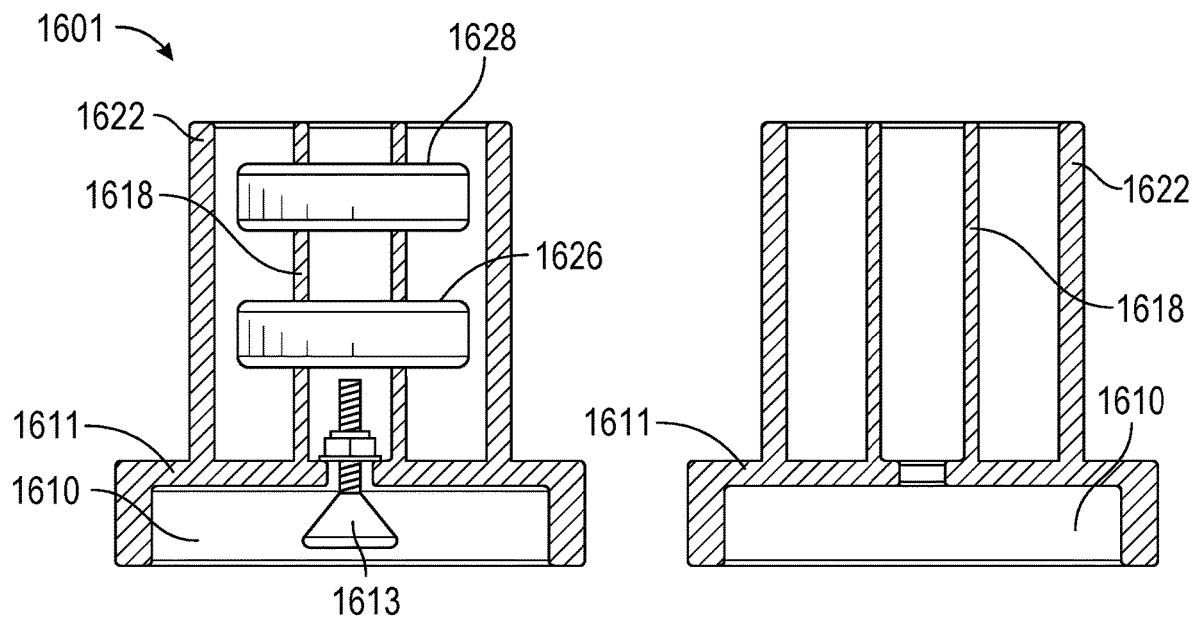
FIG. 16B illustrates cross-sectional views of an example anchor and angle adjuster assembly as per an aspect of various embodiments.

FIG. 16B illustrates cross-sectional views of an example anchor and angle adjuster assembly 1601 as per an aspect of various embodiments. The anchor and angle adjuster assembly 1601 may comprise an anchor housing 1611. For example, the anchor housing 1611 may comprise a diameter of 4.0 inches. For example, the anchor housing 1611 may comprise a height of 0.925 inches. The anchor housing 1611 may be configured to house an anchor 1610. The anchor 1610 may comprise a magnet. For example, the magnet may comprise a magnet diameter of 3.545 inches. For example, the magnet may comprise a magnet height of 0.705 inches. The anchor and angle adjuster assembly 1601 may be configured to receive an anchor fastener 1613. The anchor and angle adjuster assembly 1601 may comprise an angle adjuster. The angle adjuster may comprise an outer tube 1622. For example, the outer tube 1622 may comprise an outer diameter of 2.875 inches. For example, the outer tube 1622 may comprise an inner diameter of 2.445 inches. The angle adjuster may comprise a bearing support member 1618. For example, the bearing support member 1618 may comprise an outer diameter of 1.0 inches. The outer surface of the bearing support member 1618 may be configured to support the inner race of at least one bearing (1626 and 1628). For example, the inner race of at least one bearing (1626 and 1628) may comprise an inner diameter of 1.0 inches. The outer race of the at least one bearing (1626 and 1628) may be configured to support an inner surface of an inner tube (e.g. 1624). For example, the outer race of the at least one bearing (1626 and 1628) may comprise an outer diameter of 2.0 inches. The outer surface of the inner tube may be supported by an inner surface of the outer tube 1622. The dimensions disclosed in this example are meant to show relation between the dimensions. Persons skilled in the art will recognize that some or all of the dimensions may be changed to support other tube dimensions and/or bearing dimensions.

Figure 17A:
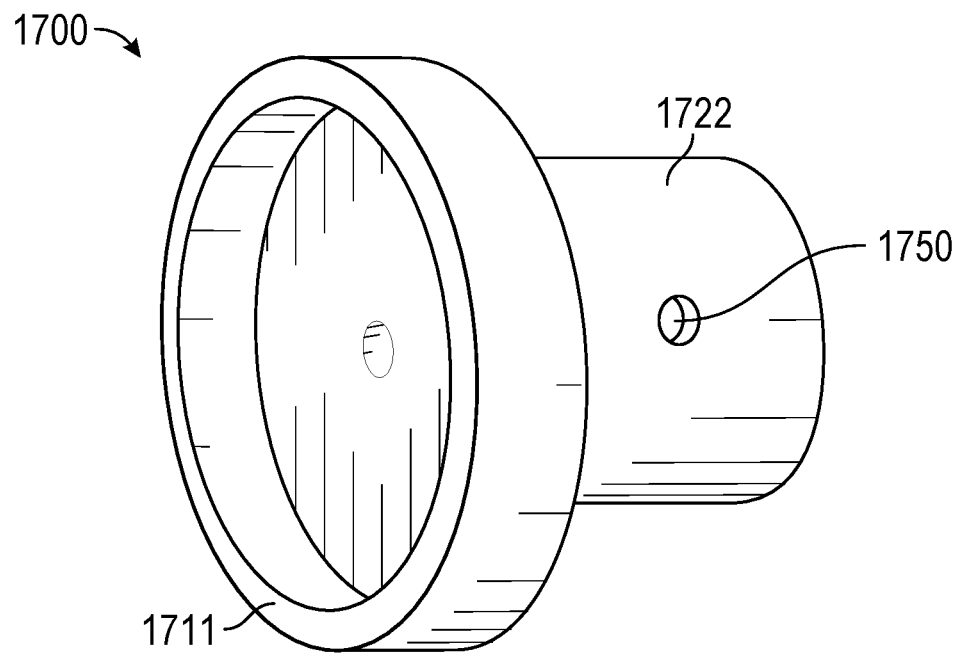
FIG. 17A illustrates an example anchor and angle adjuster assembly as per an aspect of various embodiments.

FIG. 17A illustrates an example anchor and angle adjuster assembly 1700 as per an aspect of various embodiments. The anchor and angle adjuster assembly 1700 may comprise an anchor housing 1711. The anchor and angle adjuster assembly 1700 may comprise an angle adjuster. The angle adjuster may comprise an outer tube 1722. The angle adjuster may comprise at least one alignment hole 1750.

Figure 17B:
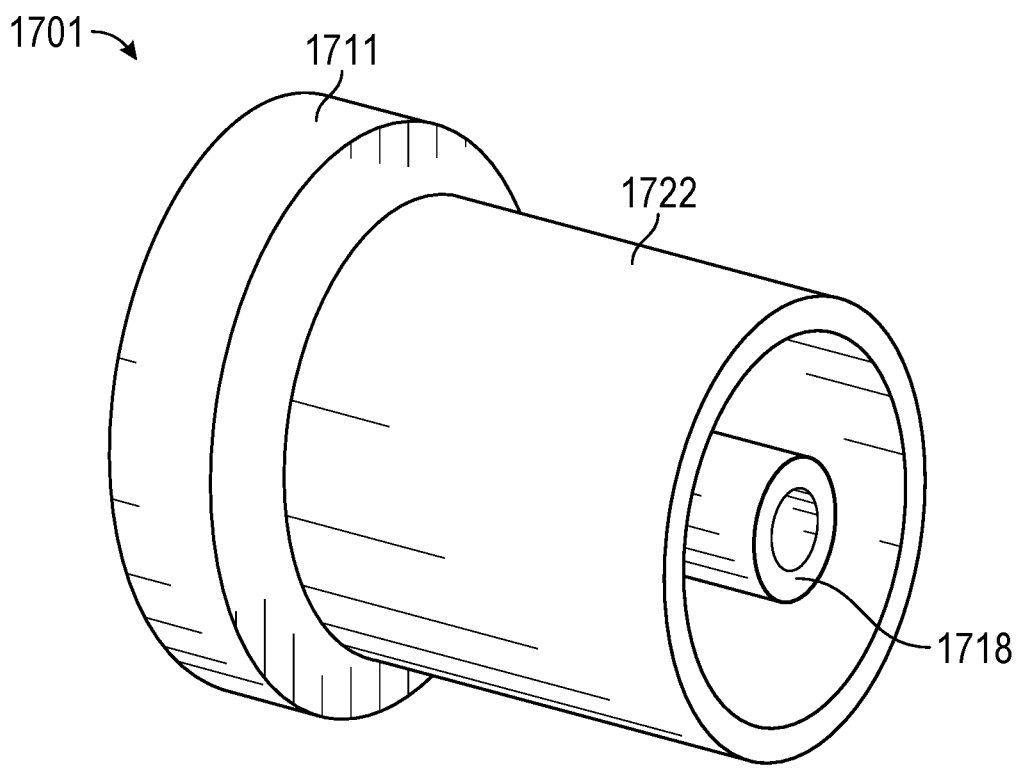
FIG. 17B illustrates an example anchor and angle adjuster assembly as per an aspect of various embodiments.

FIG. 17B illustrates an example anchor and angle adjuster assembly 1701 as per an aspect of various embodiments. The anchor and angle adjuster assembly 1701 may comprise an anchor housing 1711. The anchor and angle adjuster assembly 1701 may comprise an angle adjuster. The angle adjuster may comprise an outer tube 1722. The angle adjuster may comprise a bearing support member 1718.

Figure 18A:
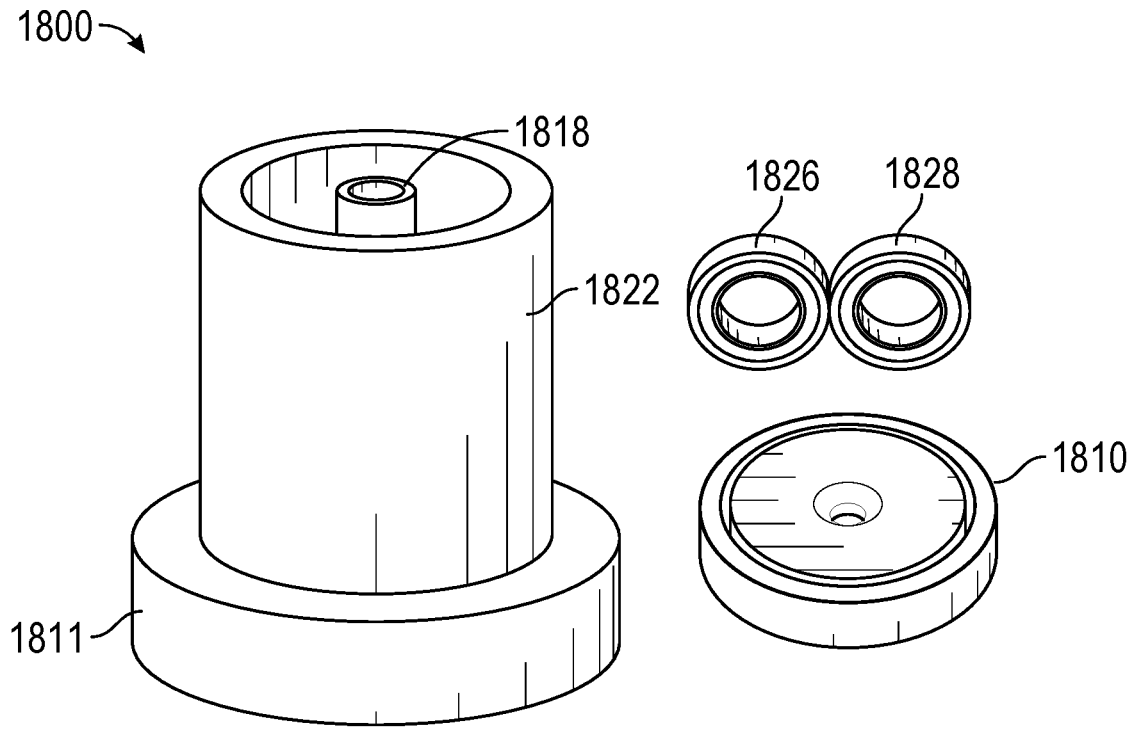
FIG. 18A illustrates an example anchor and angle adjuster assembly as per an aspect of various embodiments.

FIG. 18A illustrates an example anchor and angle adjuster assembly 1800 as per an aspect of various embodiments. The anchor and angle adjuster assembly 1800 may comprise an anchor housing 1811. The anchor housing 1811 may be configured to house an anchor 1810. The anchor 1810 may be configured to be connected to a side wall of a bed of a pickup truck. The anchor and angle adjuster assembly 1800 may comprise an angle adjuster. The angle adjuster may comprise an outer tube 1822. The angle adjuster may comprise a bearing support member 1818. The bearing support member 1818 may be structurally configured to support an inner race of a first bearing 1826. The bearing support member 1818 may be structurally configured to support an inner race of a second bearing 1828.

Figure 18B:
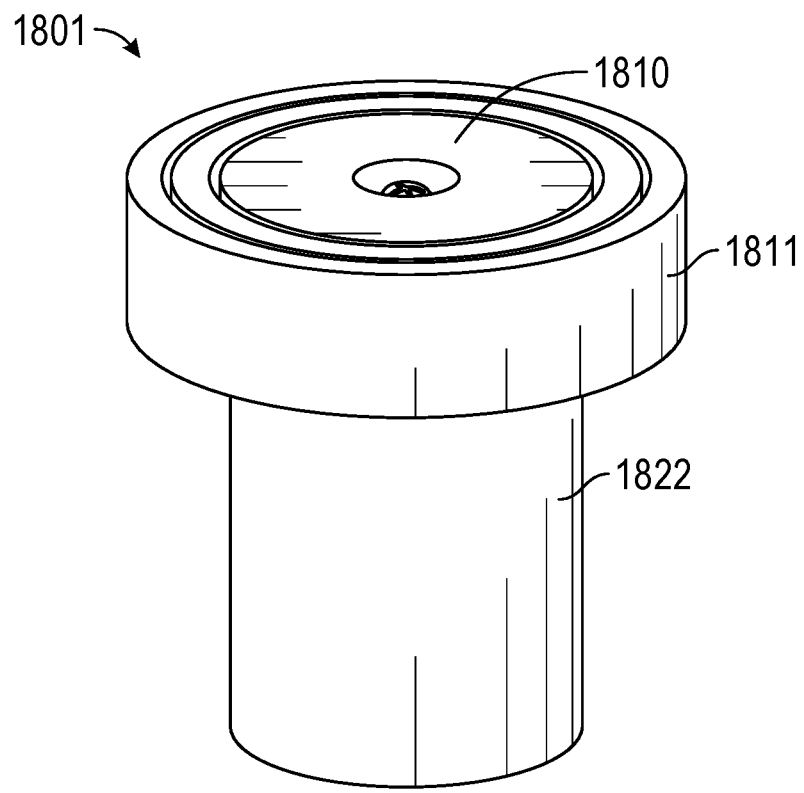
FIG. 18B illustrates an example anchor and angle adjuster assembly as per an aspect of various embodiments.

FIG. 18B illustrates an example anchor and angle adjuster assembly 1801 as per an aspect of various embodiments. The anchor and angle adjuster assembly 1801 may comprise an anchor housing 1811. The anchor housing 1811 may comprise an anchor 1810. The anchor 1810 may be configured to be connected to a side wall of a bed of a pickup truck. The anchor and angle adjuster assembly 1801 may comprise an angle adjuster. The angle adjuster may comprise an outer tube 1822.

According to an embodiment, a first angle adjuster and a second angle adjuster may each comprise an inner tube comprising external threads. The first angle adjuster and the second angle adjuster may each comprise an outer tube comprising internal threads. The outer tube may be structurally configured to threadably receive the inner tube. Threads on the second angle adjuster may be reversed from the threads on the first angle adjuster.

Figure 19A:
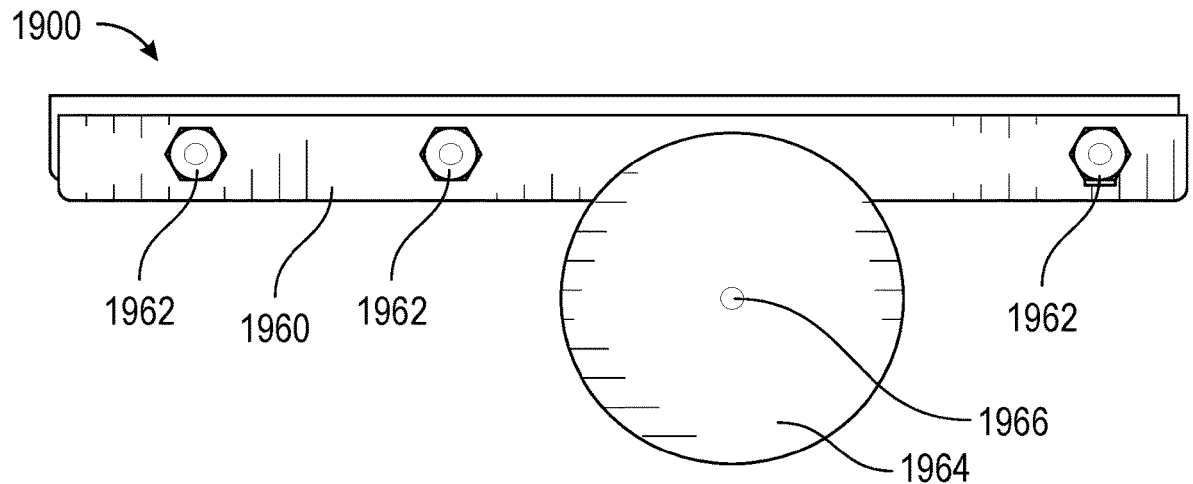
FIG. 19A illustrates an example anchor as per an aspect of an embodiment.

FIG. 19A illustrates an example anchor 1900 as per an aspect of an embodiment. The anchor 1900 may comprise a compression plate 1960. The compression plate 1960 may be U-shaped. The anchor 1900 may comprise a plurality of threaded fittings 1962. Each of the plurality of threaded fittings 1962 may comprise a threaded nut connected to the compression plate 1960. Each of the plurality of threaded fittings 1962 may comprise a threaded hole in the compression plate 1960. Each of the plurality of threaded fittings 1962 may be configured to receive a threaded bolt. The anchor 1900 may comprise an angle adjuster base plate 1964 connected to the compression plate 1960. The angle adjuster base plate 1964 may comprise a hole 1966. The hole 1966 may be threaded. The hole 1966 may be configured to receive a fastener. The fastener may be employed to connect an angle adjuster to the angle adjuster base plate 1964.

Figure 19B:
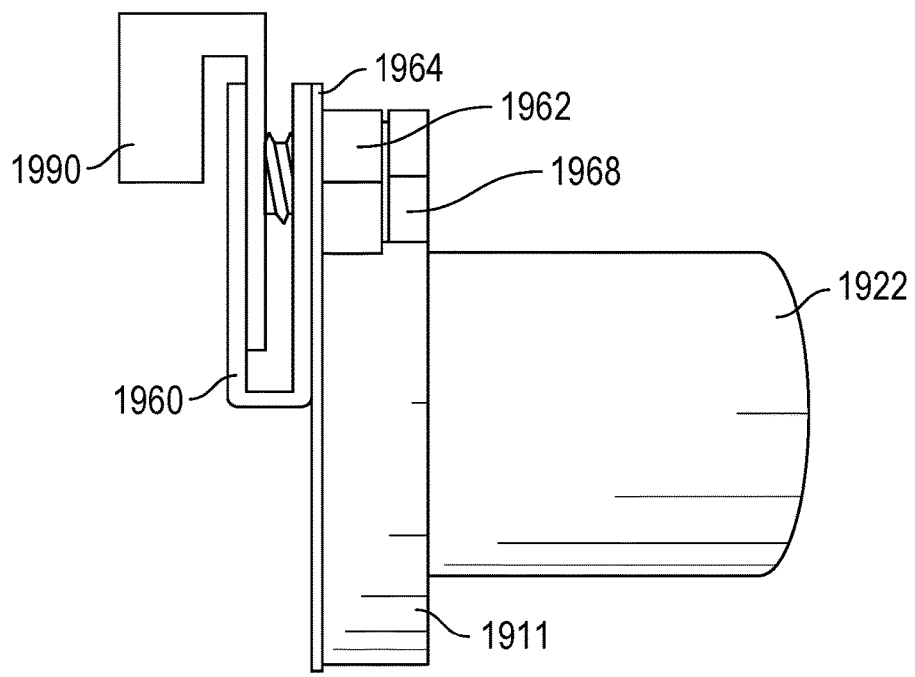
FIG. 19B illustrates a cross-sectional view of an interior lip of a side wall of a pickup-truck with an example anchor and angle adjuster assembly as per an aspect of an embodiment.

FIG. 19B illustrates a cross-sectional view of an interior lip of a side wall 1990 of a pickup-truck with an example anchor and angle adjuster assembly as per an aspect of an embodiment. The anchor and angle adjuster assembly may comprise an anchor. The anchor may comprise a compression plate 1960. The anchor may comprise at least one threaded fitting 1962. Each of the at least one threaded fitting 1962 may be configured to receive a threaded bolt 1968. The threaded bolt 1968 and the compression plate 1960 may be employed to apply pressure to the interior lip of the side wall 1990. The anchor may comprise an angle adjuster base plate 1964 connected to the compression plate 1960. The angle adjuster base plate 1964 may be sized to support an exterior (as shown) or interior surface of an anchor housing 1911. The anchor housing 1911 may be connected to an outer tube 1922 of an angle adjuster.

According to an embodiment, a rack system may comprise at least one cross-member clamp. Each of the at least one cross-member clamp may be structurally configured to clamp to a cross-member. Each of the at least one cross-member clamp may be structurally configured to clamp to a support member. Each of the at least one cross-member clamp may be structurally configured to provide an attachment point for at least one rack accessory. Each of the at least one cross-member clamp may comprise at least one pin extending inward from an inner diameter of the cross-member clamp. The cross-member may comprise at least one hole each structurally configured to receive one of the at least one pin. The cross-member may comprise a series of holes each structurally configured to receive one of the at least one pin. Each of the series of holes may correspond to one of a series of holes in at least one angle adjuster. The cross-member may comprise a plurality of series of holes, each series of holes in the plurality of series of holes located in a distinct location along the cross-member to accommodate one or more loads. Each series of holes may be located in a distinct location along the cross-member to accommodate a plurality of load widths. The support member may comprise at least one hole each structurally configured to receive one of the at least one pin.

Figure 20:
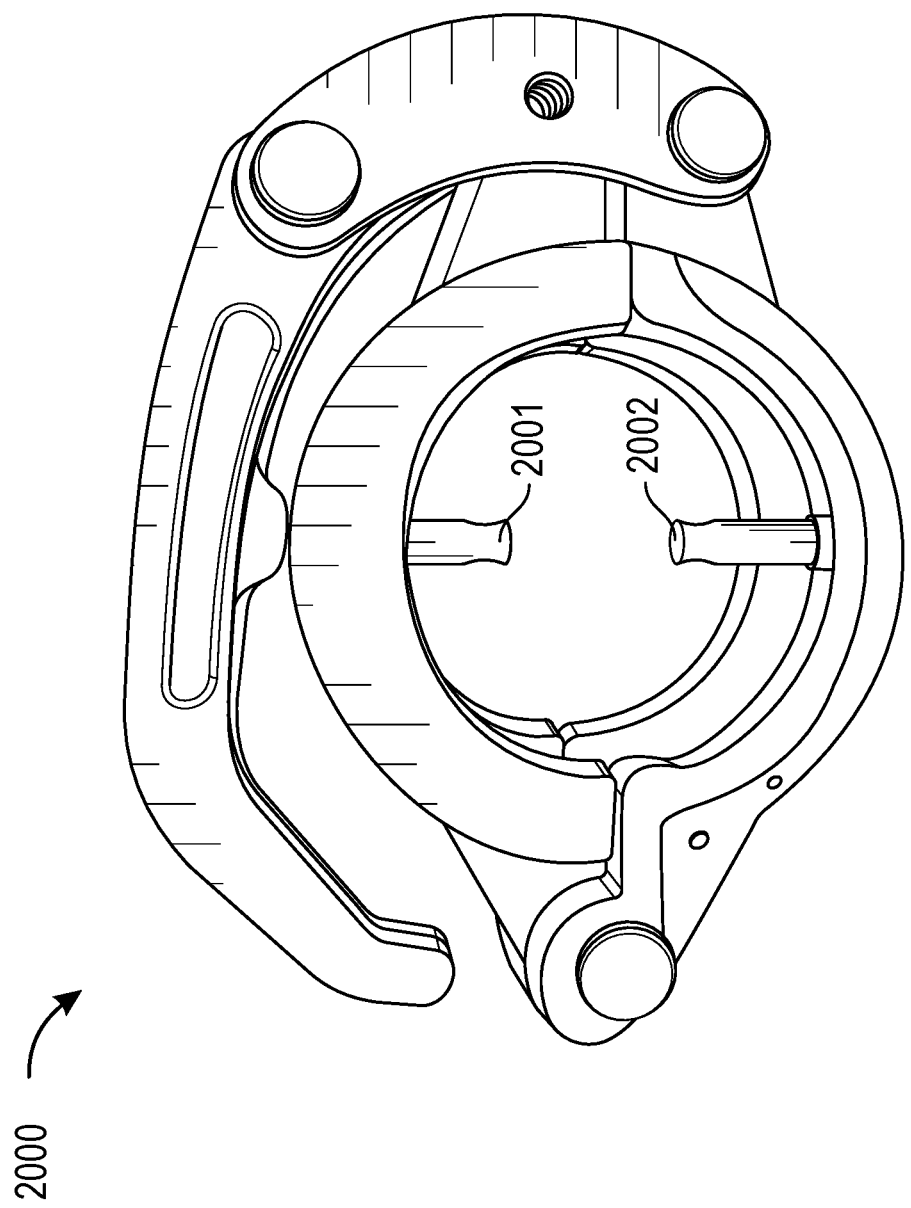
FIG. 20 illustrates an example cross-member clamp as per an aspect of various embodiments.

FIG. 20 illustrates an example cross-member clamp 2000 as per an aspect of various embodiments. The cross-member clamp 2000 may comprise a first pin 2001. The cross-member clamp 2000 may comprise a second pin 2002. The first pin 2001 and the second pin 2002 may extend inward from an inner diameter of the cross-member clamp.

Figure 21A:
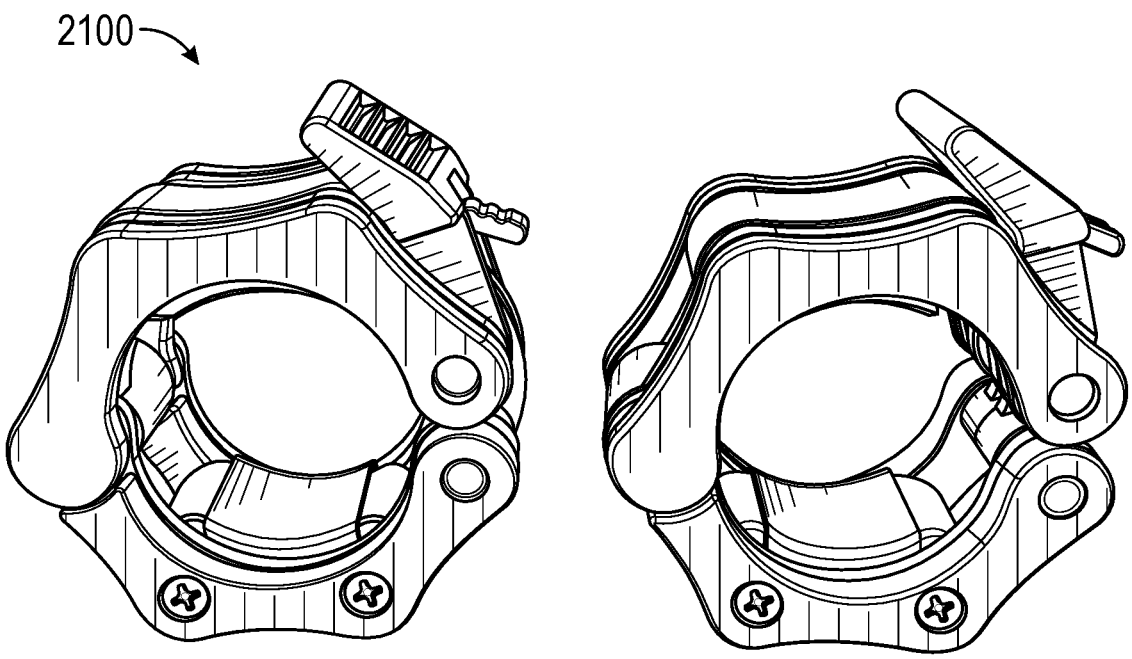
FIGS. 21A and 21B illustrate existing clamps known in the art that may be employed to clamp to a cross-member to secure a load.
Figure 21B:
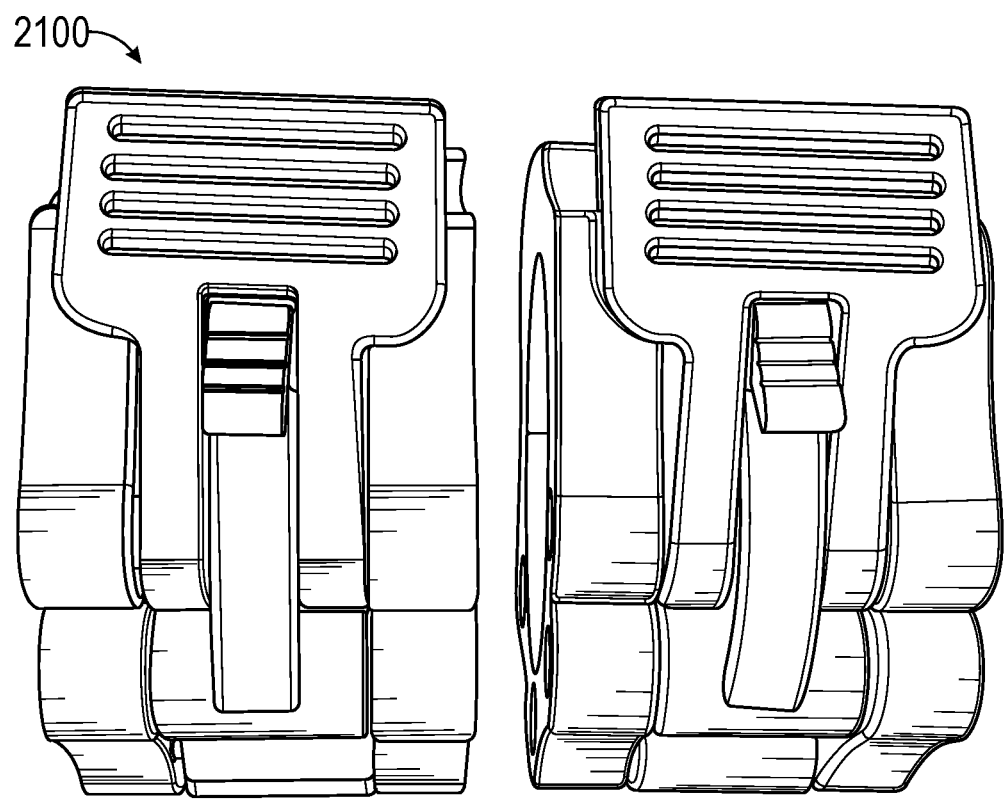

FIGS. 21A and 21B illustrate existing clamps 2100 known in the art that may be employed to clamp to a cross-member to secure a load. For example, a load may be secured by connecting a strap to at least one of the clamps 2100. For example, a load may be secured by connecting a rack accessory to at least one of the clamps 2100.

Figure 22A:
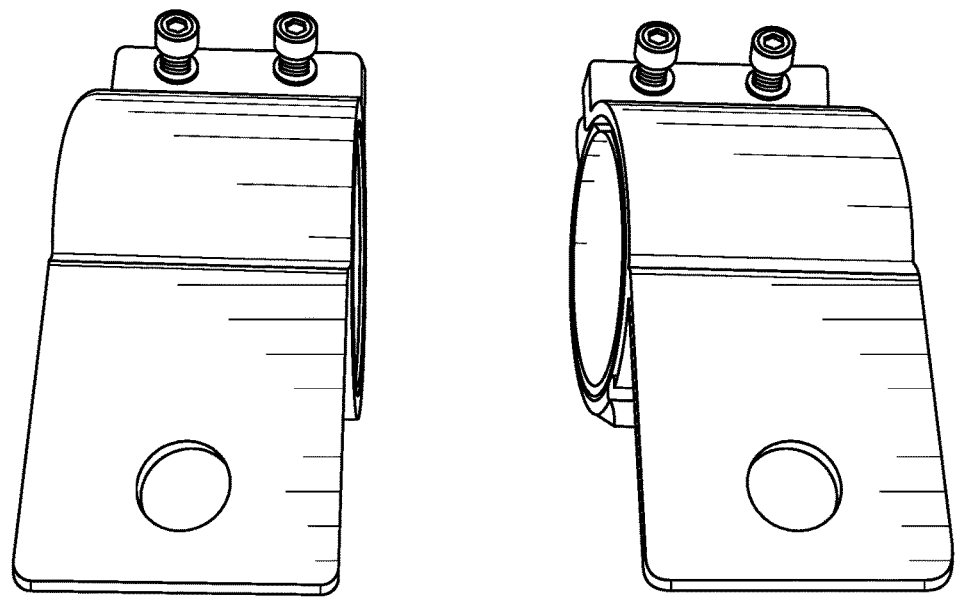
FIGS. 22A and 22B illustrate existing clamps known in the art that may be employed to clamp to a cross-member to secure a load.
Figure 22B:
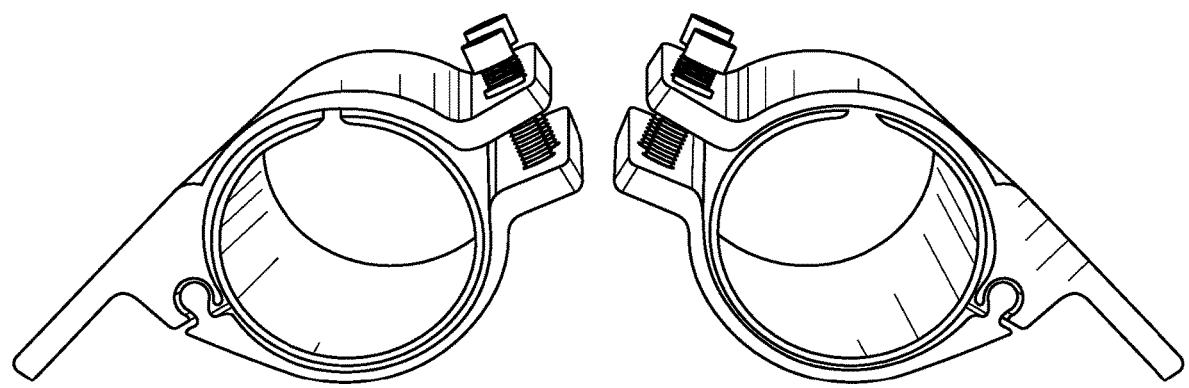

FIGS. 22A and 22B illustrate existing clamps 2200 known in the art that may be employed to clamp to a cross-member to secure a load. For example, a load may be secured by connecting a strap to at least one of the clamps 2200. For example, a load may be secured by connecting a rack accessory to at least one of the clamps 2200.

Figure 23A:
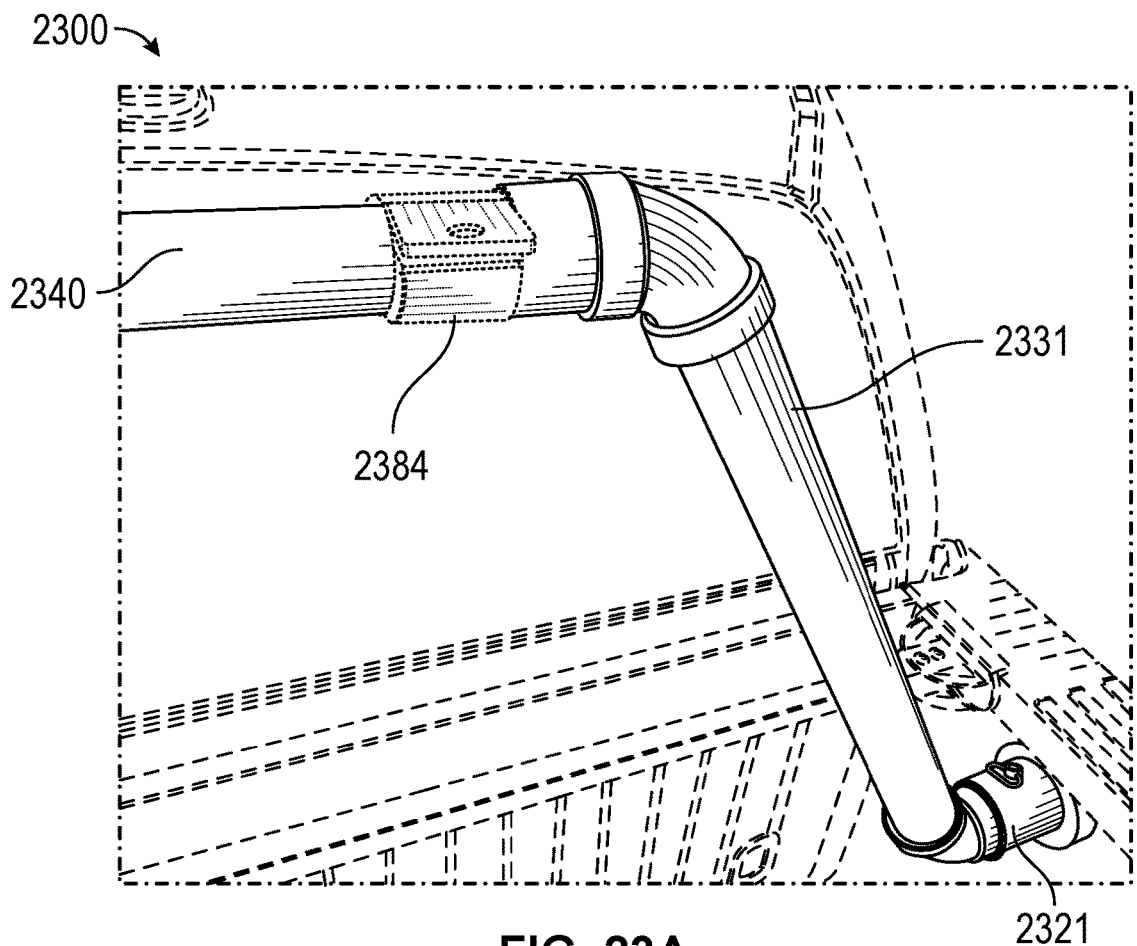
FIG. 23A illustrates a portion of an example rack system with an example clamp as per an aspect of various embodiments.

FIG. 23A illustrates a portion of an example rack system 2300, mounted to a pickup truck, with an example clamp 2384 as per an aspect of various embodiments. The rack system may comprise a support member 2331. The rack system may comprise an anchor and adjuster assembly 2321. The rack system may comprise a cross-member 2340. The clamp 2384 may be secured to the cross-member 2340 (as shown). The clamp 2384 may be secured to the support member 2331. The clamp 2384 may be employed to secure a load.

Figure 23B:
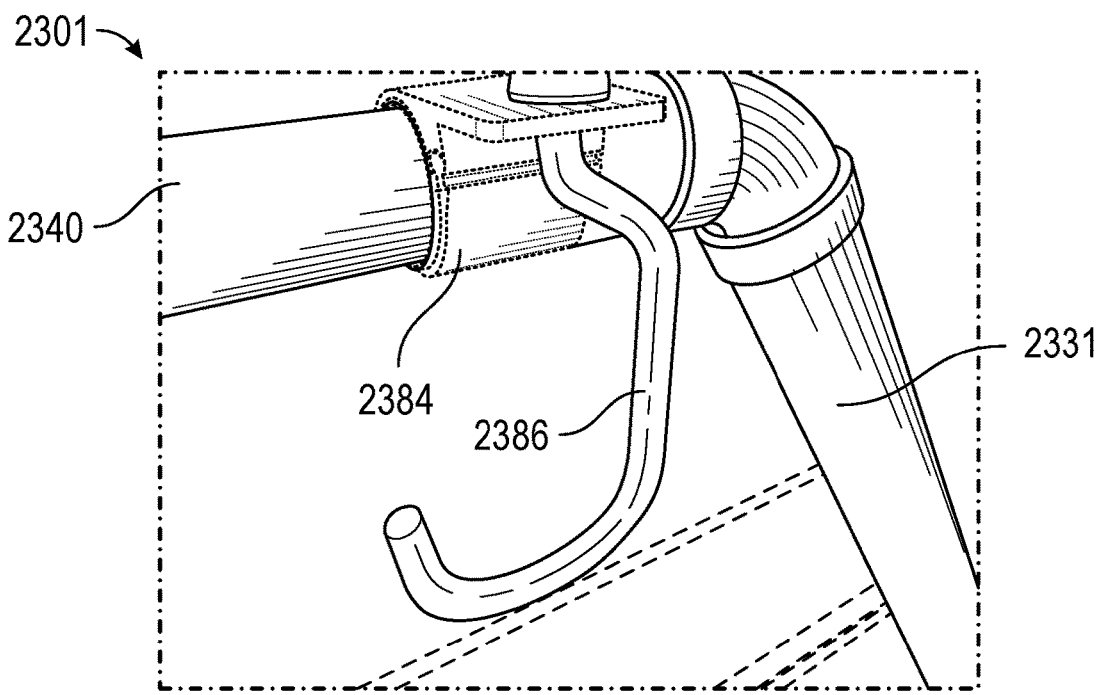
FIG. 23B illustrates a portion of an example rack system with an example clamp as per an aspect of various embodiments.

FIG. 23B illustrates a portion of an example rack system 2301, mounted to a pickup truck, with an example clamp 2384 as per an aspect of various embodiments. The rack system may comprise a support member 2331. The rack system may comprise a cross-member 2340. The clamp 2384 may be secured to the cross-member 2340 (as shown). The clamp 2384 may be secured to the support member 2331. A hook 2386 may be secured to the clamp 2384. The hook 2386 may be employed to secure a load such as, for example, a bicycle.

Figure 24:
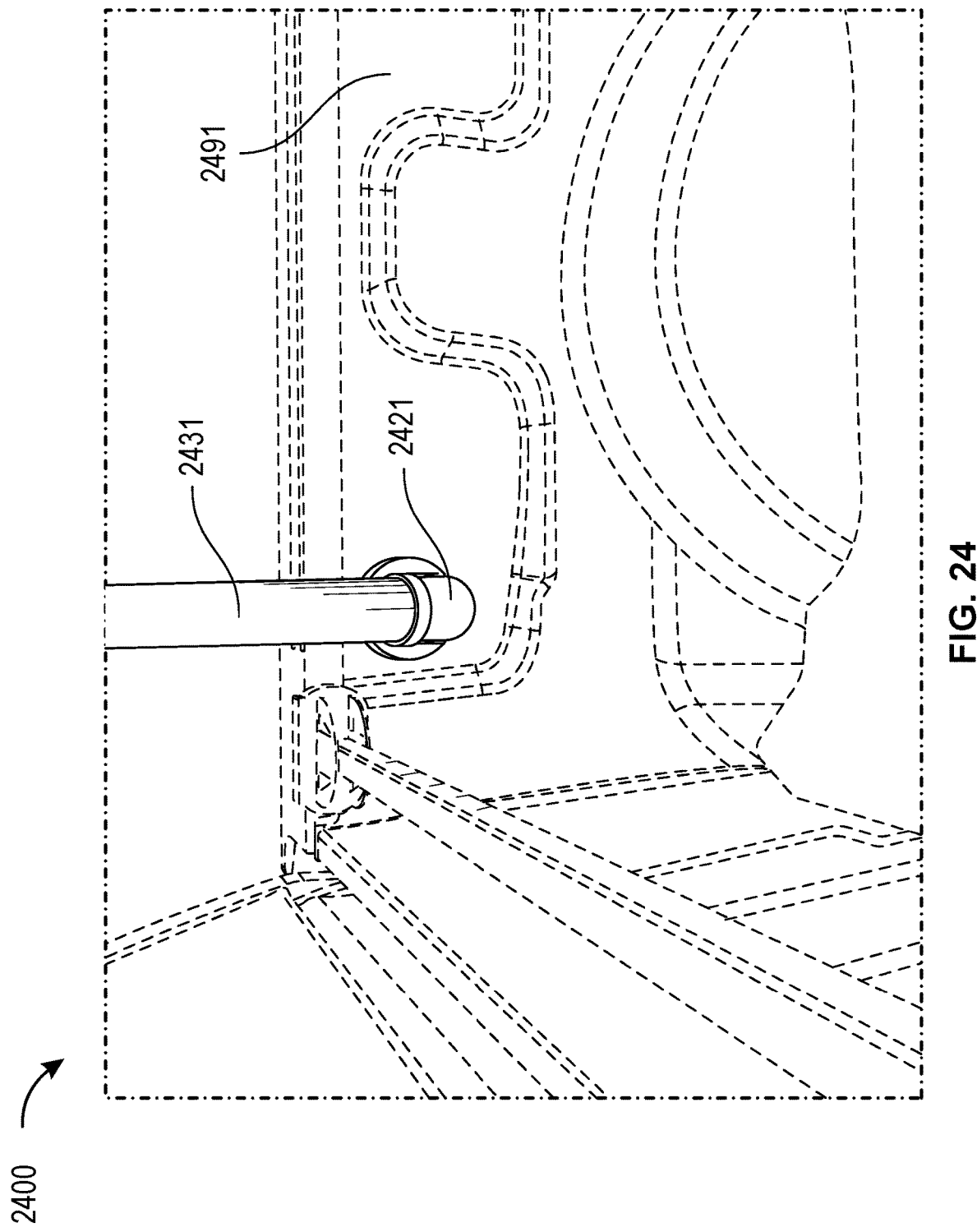
FIG. 24 illustrates a portion of an example rack system at a first angle as per an aspect of an embodiment.

FIG. 24 illustrates a portion of an example rack system 2400, mounted to a pickup truck, at a first angle as per an aspect of an embodiment. The rack system may comprise a support member 2431. The rack system may comprise an anchor and adjuster assembly 2421. The anchor and adjuster assembly 2421 may comprise an anchor and an angle adjuster. The anchor may be structurally configured to connect to a side wall 2491. The angle adjuster may comprise a locking mechanism. The locking mechanism may be structurally configured to lock at a first angle (as shown).

Figure 25:
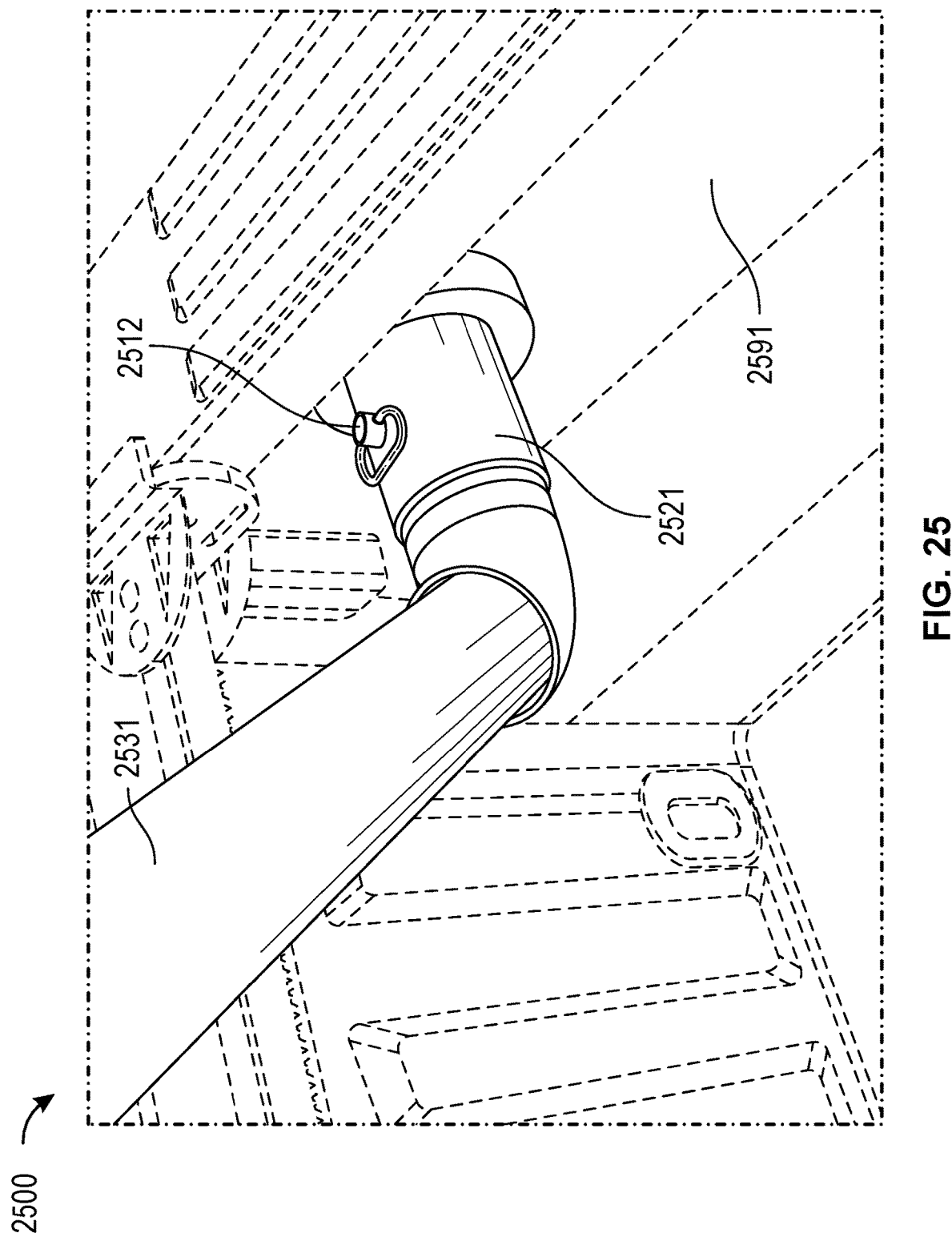
FIG. 25 illustrates a portion of an example rack system at a first angle as per an aspect of an embodiment.

FIG. 25 illustrates a portion of an example rack system 2500, mounted to a pickup truck, at a first angle as per an aspect of an embodiment. The rack system may comprise a support member 2531. The rack system may comprise an anchor and adjuster assembly 2521. The anchor and adjuster assembly 2521 may comprise an anchor and an angle adjuster. The anchor may be structurally configured to connect to a side wall 2591. The angle adjuster may comprise a locking mechanism 2512. The locking mechanism 2512 may be structurally configured to lock at a first angle (as shown).

Figure 26:
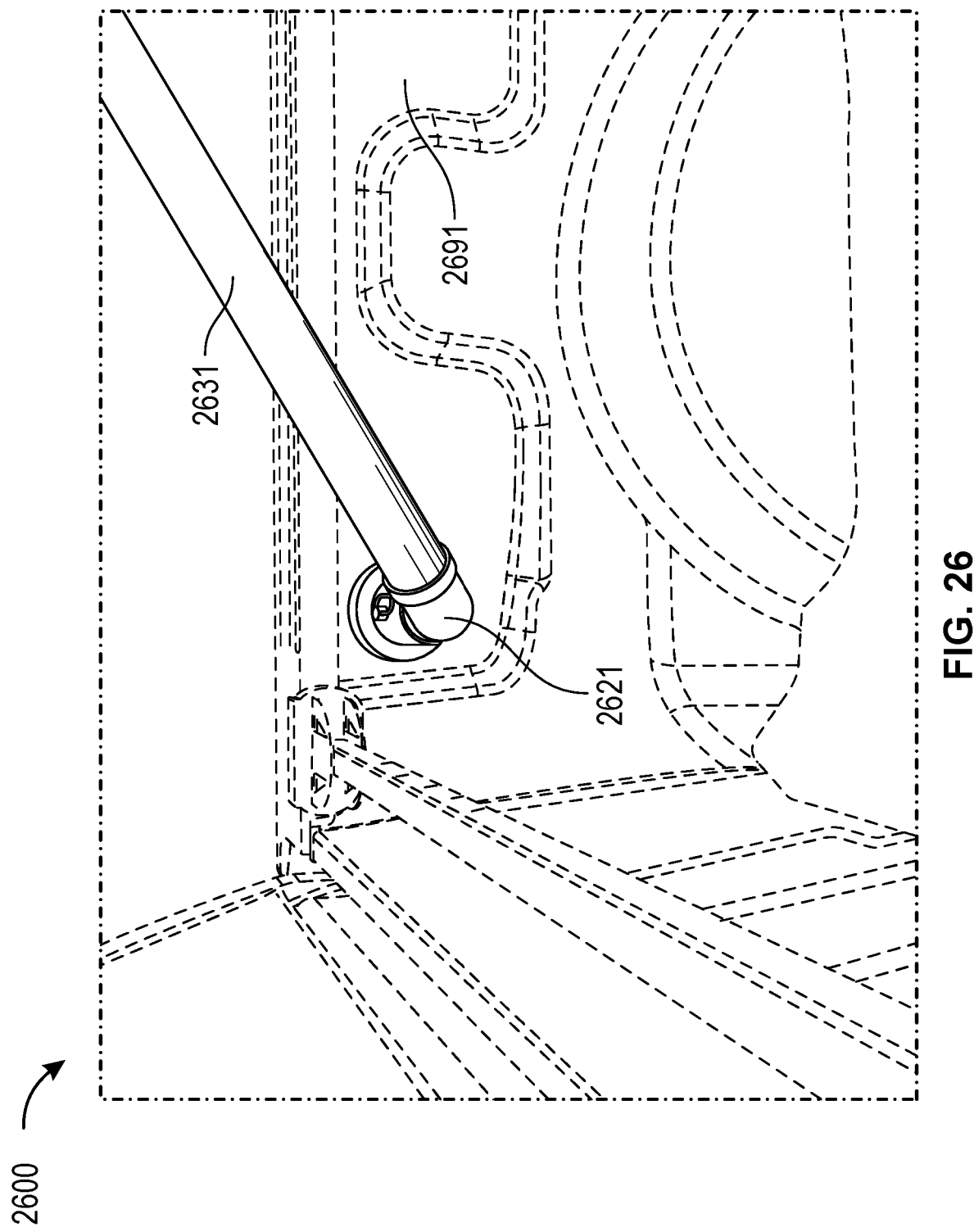
FIG. 26 illustrates a portion of an example rack system at a third angle as per an aspect of an embodiment.

FIG. 26 illustrates a portion of an example rack system 2600, mounted to a pickup truck, at a third angle as per an aspect of an embodiment. The rack system may comprise a support member 2631. The rack system may comprise an anchor and adjuster assembly 2621. The anchor and adjuster assembly 2621 may comprise an anchor and an angle adjuster. The anchor may be structurally configured to connect to a side wall 2691. The angle adjuster may comprise a locking mechanism. The locking mechanism may be structurally configured to lock at a third angle (as shown).

Figure 27:
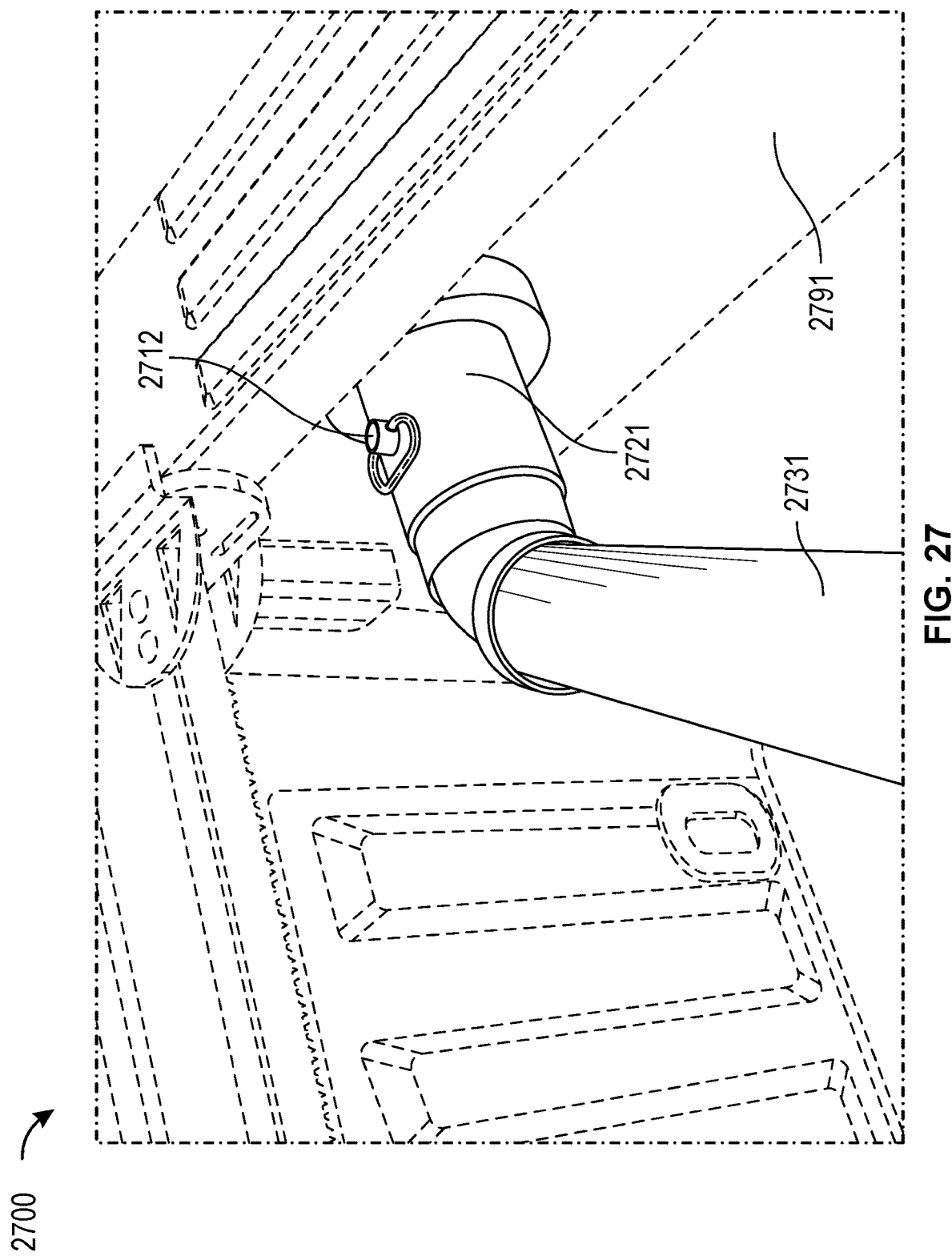
FIG. 27 illustrates a portion of an example rack system at a third angle as per an aspect of an embodiment.

FIG. 27 illustrates a portion of an example rack system 2700, mounted to a pickup truck, at a third angle as per an aspect of an embodiment. The rack system may comprise a support member 2731. The rack system may comprise an anchor and adjuster assembly 2721. The anchor and adjuster assembly 2721 may comprise an anchor and an angle adjuster. The anchor may be structurally configured to connect to a side wall 2791. The angle adjuster may comprise a locking mechanism 2712. The locking mechanism 2712 may be structurally configured to lock at a third angle (as shown).

Figure 28:
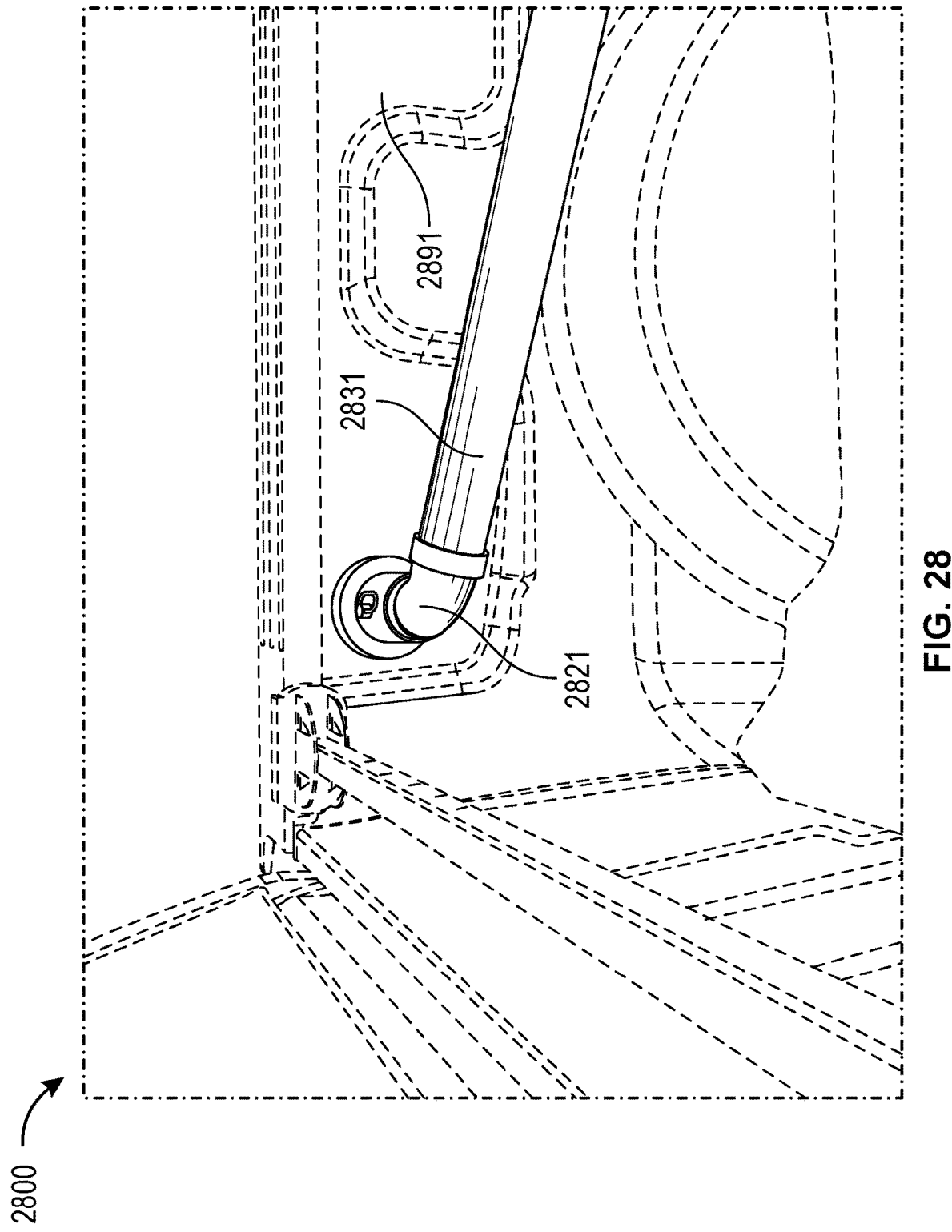
FIG. 28 illustrates a portion of an example rack system at a second angle as per an aspect of an embodiment.

FIG. 28 illustrates a portion of an example rack system 2800, mounted to a pickup truck, at a second angle as per an aspect of an embodiment. The rack system may comprise a support member 2831. The rack system may comprise an anchor and adjuster assembly 2821. The anchor and adjuster assembly 2821 may comprise an anchor and an angle adjuster. The anchor may be structurally configured to connect to a side wall 2891. The angle adjuster may comprise a locking mechanism. The locking mechanism may be structurally configured to lock at a second angle (as shown).

Figure 29:
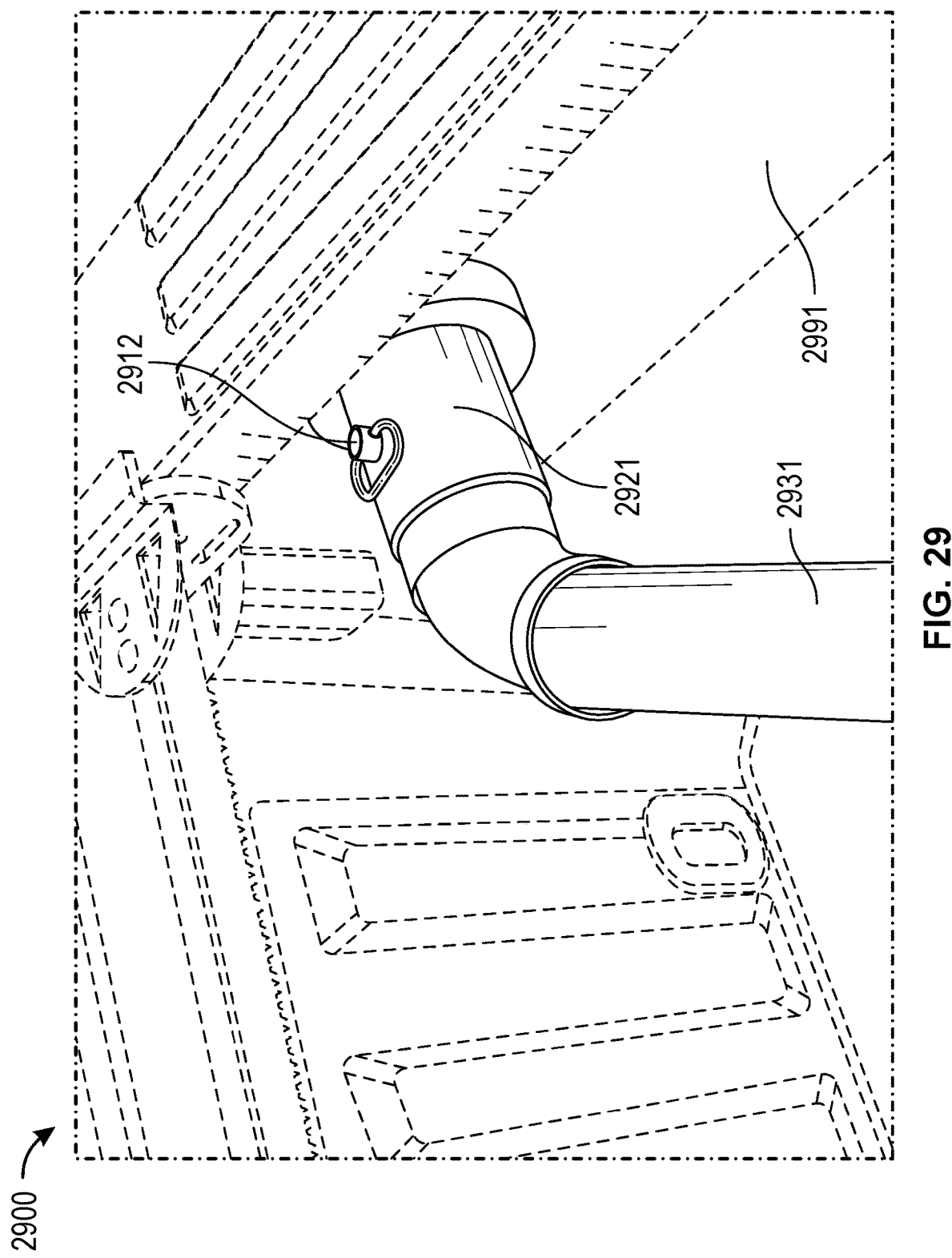
FIG. 29 illustrates a portion of an example rack system at a second angle as per an aspect of an embodiment.

FIG. 29 illustrates a portion of an example rack system 2900, mounted to a pickup truck, at a second angle as per an aspect of an embodiment. The rack system may comprise a support member 2931. The rack system may comprise an anchor and adjuster assembly 2921. The anchor and adjuster assembly 2921 may comprise an anchor and an angle adjuster. The anchor may be structurally configured to connect to a side wall 2991. The angle adjuster may comprise a locking mechanism 2912. The locking mechanism 2912 may be structurally configured to lock at a second angle (as shown).

Figure 30:
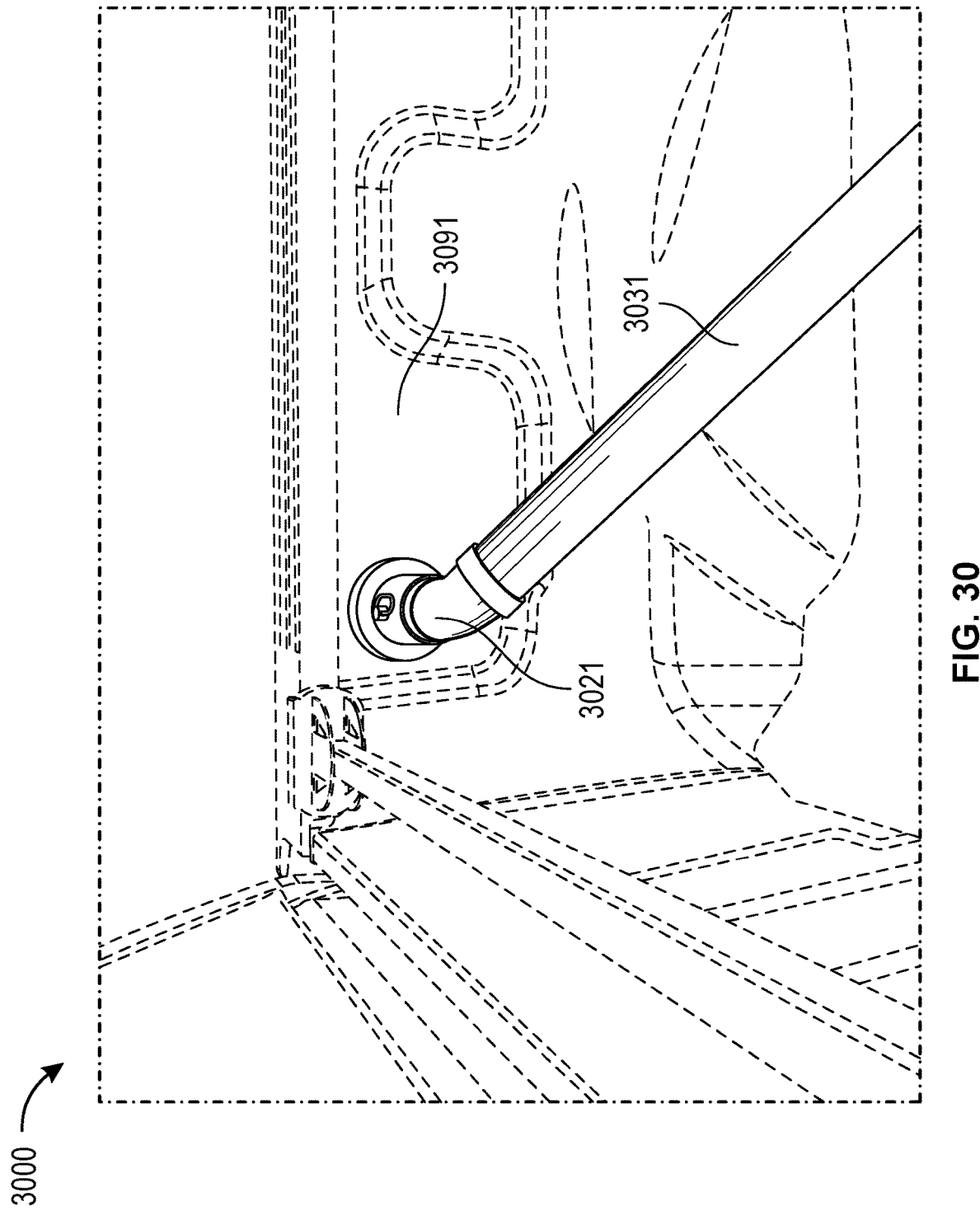
FIG. 30 illustrates a portion of an example rack system at a fourth angle as per an aspect of an embodiment.

FIG. 30 illustrates a portion of an example rack system 3000, mounted to a pickup truck, at a fourth angle as per an aspect of an embodiment. The rack system may comprise a support member 3031. The rack system may comprise an anchor and adjuster assembly 3021. The anchor and adjuster assembly 3021 may comprise an anchor and an angle adjuster. The anchor may be structurally configured to connect to a side wall 3091. The angle adjuster may comprise a locking mechanism. The locking mechanism may be structurally configured to lock at a fourth angle (as shown).

Figure 31:
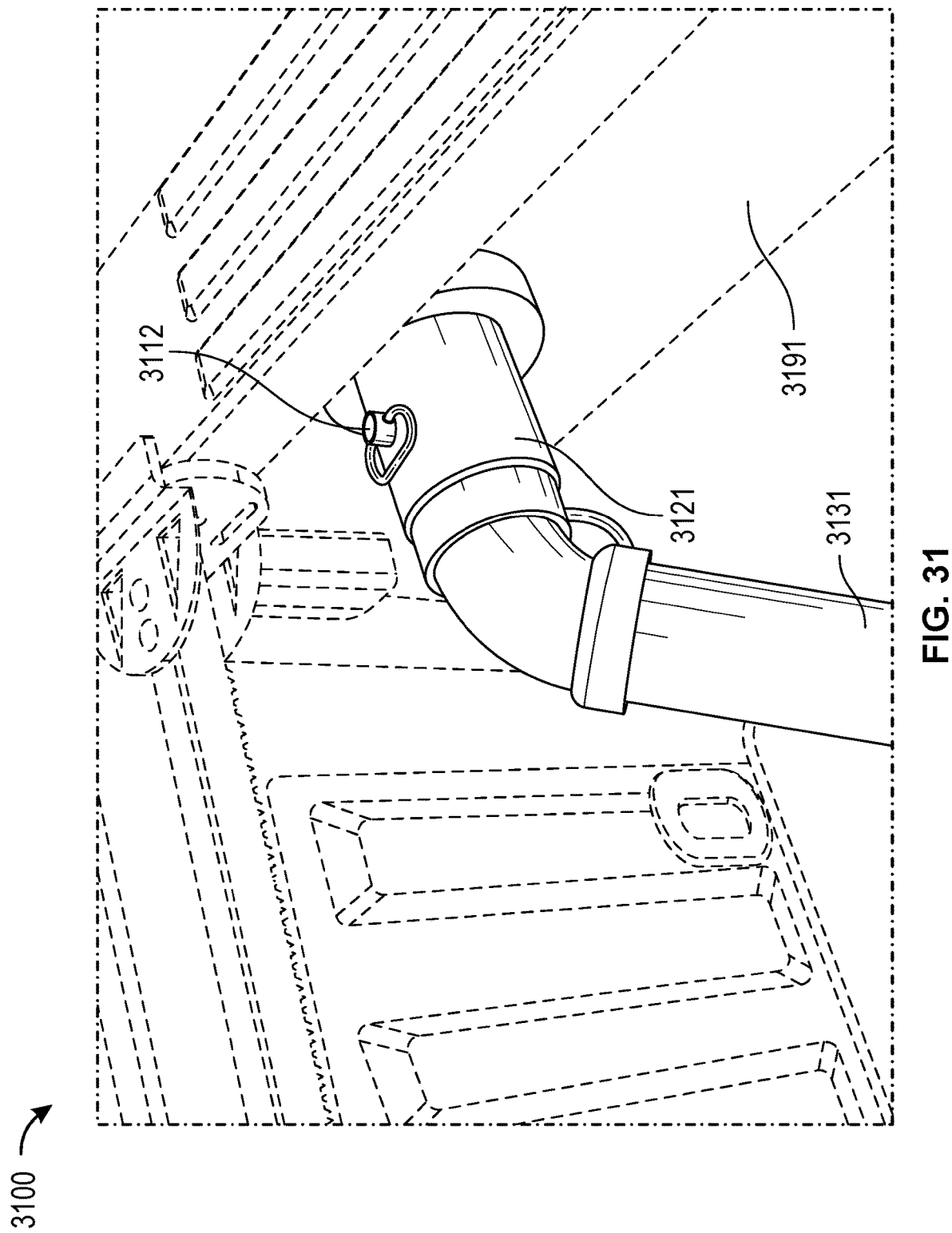
FIG. 31 illustrates a portion of an example rack system at a fourth angle as per an aspect of an embodiment.

FIG. 31 illustrates a portion of an example rack system 3100, mounted to a pickup truck, at a fourth angle as per an aspect of an embodiment. The rack system may comprise a support member 3131. The rack system may comprise an anchor and adjuster assembly 3121. The anchor and adjuster assembly 3121 may comprise an anchor and an angle adjuster. The anchor may be structurally configured to connect to a side wall 3191. The angle adjuster may comprise a locking mechanism 3112. The locking mechanism 3112 may be structurally configured to lock at a fourth angle (as shown).

Figure 32:
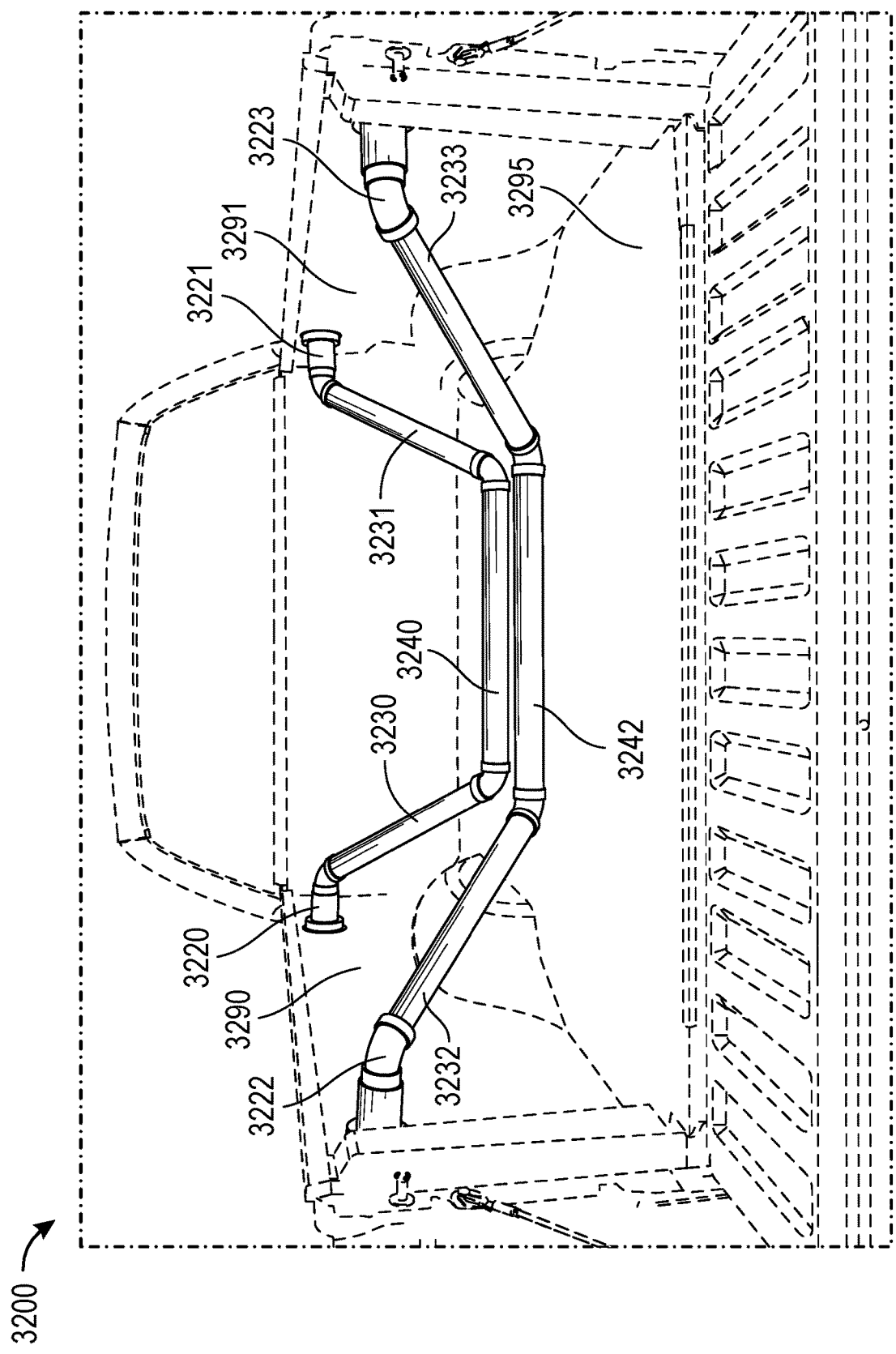
FIG. 32 illustrates an example pair of rack systems at a fifth angle as per an aspect of an embodiment.

FIG. 32 illustrates an example pair of rack systems 3200, mounted to a pickup truck, at a fifth angle as per an aspect of an embodiment. A first rack system in the pair of rack systems may comprise a first anchor and adjuster assembly 3220. The first anchor and adjuster assembly 3220 may comprise a first anchor and a first angle adjuster. The first anchor may be structurally configured to connect to a first side wall 3290. The first angle adjuster may comprise a first locking mechanism. The first locking mechanism may be structurally configured to lock at a fifth angle (as shown). The first rack system may comprise a second anchor and adjuster assembly 3221. The second anchor and adjuster assembly 3221 may comprise a second anchor and a second angle adjuster. The second anchor may be structurally configured to connect to a second side wall 3291. The second angle adjuster may comprise a second locking mechanism. The second locking mechanism may be structurally configured to lock at the fifth angle (as shown). The first rack system may comprise a first support member 3230 and a second support member 3231. The first rack system may comprise a first cross-member 3240. The first cross-member 3240 may be in contact with a floor 3295. A second rack system in the pair of rack systems may comprise a third anchor and adjuster assembly 3222. The third anchor and adjuster assembly 3222 may comprise a third anchor and a third angle adjuster. The third anchor may be structurally configured to connect to the first side wall 3290. The third angle adjuster may comprise a third locking mechanism. The third locking mechanism may be structurally configured to lock at the fifth angle (as shown). The second rack system may comprise a fourth anchor and adjuster assembly 3223. The fourth anchor and adjuster assembly 3223 may comprise a fourth anchor and a fourth angle adjuster. The fourth anchor may be structurally configured to connect to the second side wall 3291. The fourth angle adjuster may comprise a fourth locking mechanism. The fourth locking mechanism may be structurally configured to lock at the fifth angle (as shown). The second rack system may comprise a third support member 3232 and a forth support member 3233. The second rack system may comprise a second cross-member 3242. The second cross-member 3242 may be in contact with the floor 3295.

Figure 33:
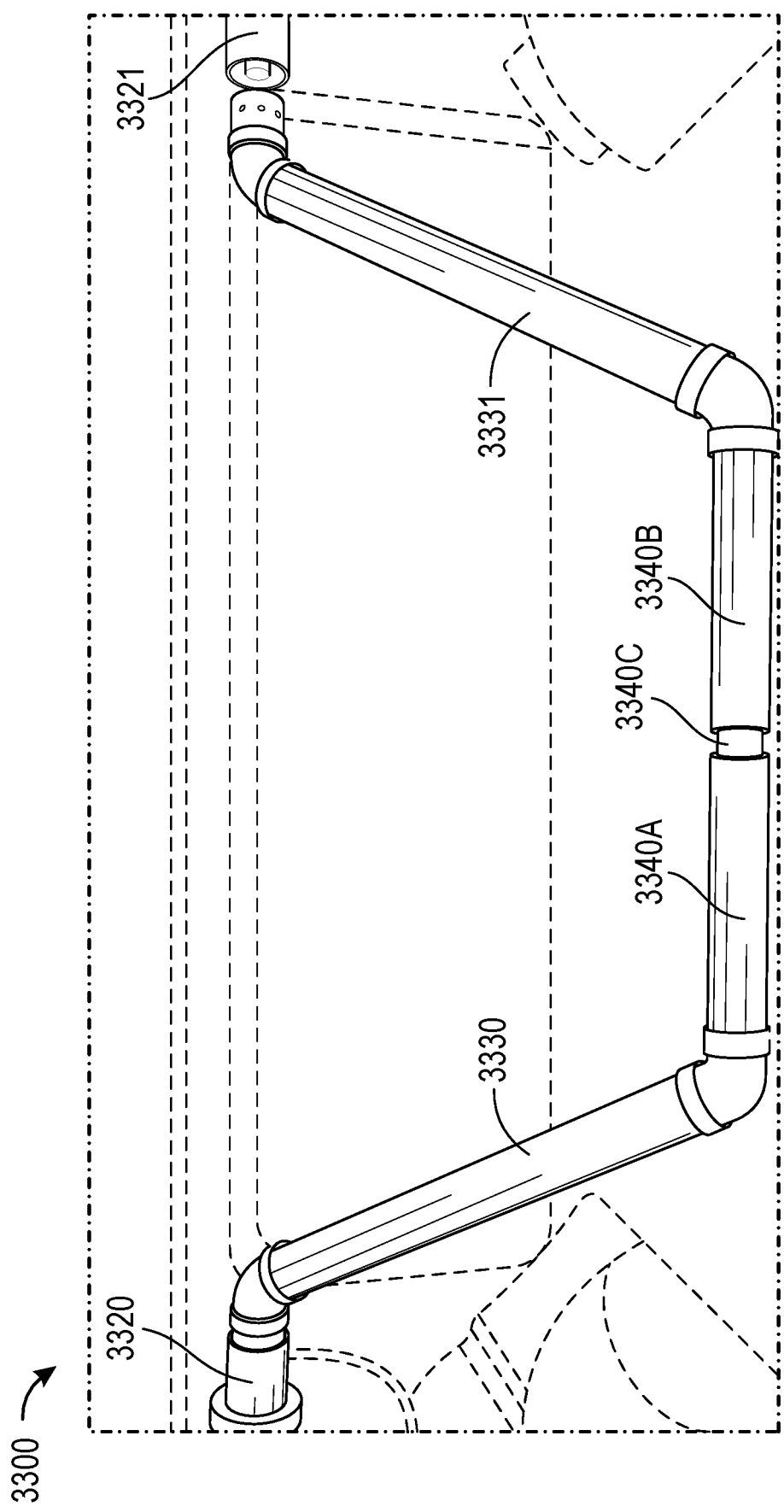
FIG. 33 illustrates an example rack system with a cross-member adjusted to a first length as per an aspect of an embodiment.

FIG. 33 illustrates an example rack system 3300, partially mounted to a pickup truck, with a cross-member adjusted to a first length as per an aspect of an embodiment. The rack system may comprise a first anchor and adjuster assembly 3320. The rack system may comprise a second anchor and adjuster assembly 3321. The rack system may comprise a first support member 3330 and a second support member 3331. The first support member 3330 may be connected to a first inner tube of a first angle adjuster of the first anchor and adjuster assembly 3320. The second support member 3331 may be connected to a second inner tube of a second angle adjuster of the second anchor and adjuster assembly 3321. The rack system may comprise a cross-member. The cross-member may comprise a first tube 3340A, a second tube 3340B, and a third tube 3340C. In this example, the third tube 3340C comprises an inner tube. The first tube 3340A and the second tube 3340B may each comprise an outer tube. The first tube 3340A may be fixed in relation to the first support member 3330. The second tube 3340B may be fixed in relation to the second support member 3331. The third tube 3340C may be structurally configured to slide with respect to the first tube 3340A and/or the second tube 3340B. This allows the rack system to be adjusted to the width of a bed of the pickup truck.

Figure 34:
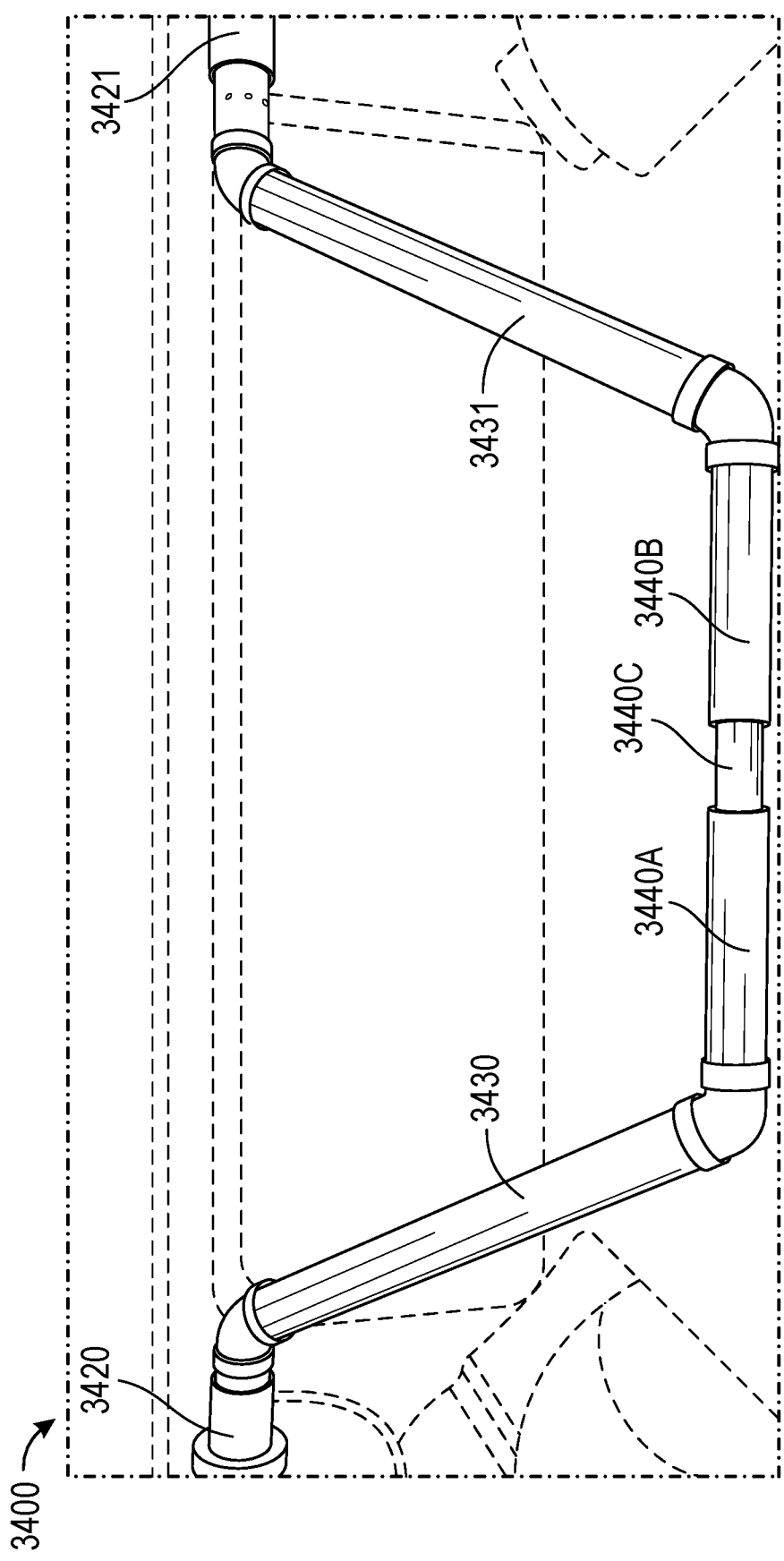
FIG. 34 illustrates an example rack system with a cross-member adjusted to a second length as per an aspect of an embodiment.

FIG. 34 illustrates an example rack system 3400, partially mounted to a pickup truck, with a cross-member adjusted to a second length as per an aspect of an embodiment. The rack system may comprise a first anchor and adjuster assembly 3420. The rack system may comprise a second anchor and adjuster assembly 3421. The rack system may comprise a first support member 3430 and a second support member 3431. The first support member 3430 may be connected to a first inner tube of a first angle adjuster of the first anchor and adjuster assembly 3420. The second support member 3431 may be connected to a second inner tube of a second angle adjuster of the second anchor and adjuster assembly 3421. The rack system may comprise a cross-member. The cross-member may comprise a first tube 3440A, a second tube 3440B, and a third tube 3440C. In this example, the third tube 3440C comprises an inner tube. The first tube 3440A and the second tube 3440B may each comprise an outer tube. The first tube 3440A may be fixed in relation to the first support member 3430. The second tube 3440B may be fixed in relation to the second support member 3431. The third tube 3440C may be structurally configured to slide with respect to the first tube 3440A and/or the second tube 3440B. This allows the rack system to be adjusted to the width of a bed of the pickup truck.

Figure 35:
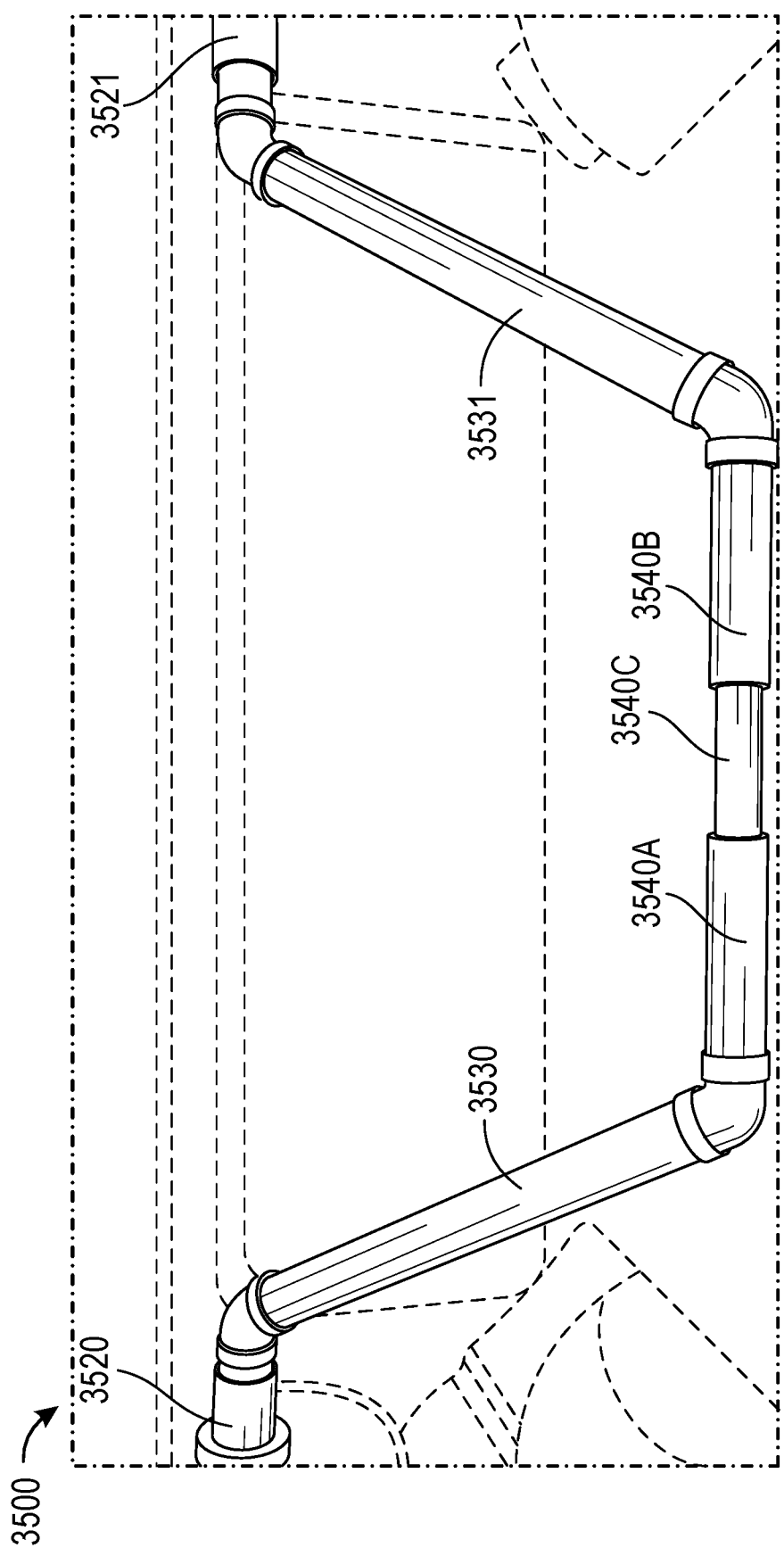
FIG. 35 illustrates an example rack system with a cross-member adjusted to a third length as per an aspect of an embodiment.

FIG. 35 illustrates an example rack system 3500, partially mounted to a pickup truck, with a cross-member adjusted to a third length as per an aspect of an embodiment. The rack system may comprise a first anchor and adjuster assembly 3520. The rack system may comprise a second anchor and adjuster assembly 3521. The rack system may comprise a first support member 3530 and a second support member 3531. The rack system may comprise a cross-member. The cross-member may comprise a first tube 3540A, a second tube 3540B, and a third tube 3540C. In this example, the third tube 3540C comprises an inner tube. The first tube 3540A and the second tube 3540B may each comprise an outer tube. The first tube 3540A may be fixed in relation to the first support member 3530. The second tube 3540B may be fixed in relation to the second support member 3531. The third tube 3540C may be structurally configured to slide with respect to the first tube 3540A and/or the second tube 3540B. This allows the rack system to be adjusted to the width of a bed of the pickup truck. The third tube 3540C may comprise a series of holes. The first tube 3540A and/or the second tube 3540B may comprise at least one alignment hole. Alignment of the at least one alignment hole with a first of the series of holes may correspond to a first length. Alignment of the at least one alignment hole with a second of the series of holes may correspond to a second length, and so on. The series of holes and the at least one alignment hole may be structurally configured to receive a hitch pin, a cotter pin, at least one spring loaded pin, a quick disconnect pin, combinations thereof, and/or the like to lock the cross-member length. The cross-member length may be locked once the first support member 3530 is locked to a first angle adjuster included in the first anchor and adjuster assembly 3520 and the second support member 3531 is locked to a second angle adjuster included in the second anchor and adjuster assembly 3521.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "a", "an", and "one" are not to be interpreted as "only one". In this specification, the term "may" is to be interpreted as "may, for example." In other words, the term "may" is indicative that the phrase following the term "may" is an example of one of a multitude of suitable possibilities that may, or may not, be employed to one or more of the various embodiments. In this specification, the phrase "based on" is indicative that the phrase following the term "based on" is an example of one of a multitude of suitable possibilities that may, or may not, be employed to one or more of the various embodiments. References to "an" embodiment in this disclosure are not necessarily to the same embodiment.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

In this specification, various embodiments are disclosed. Limitations, features, and/or elements from the disclosed example embodiments may be combined to create further embodiments within the scope of the disclosure.

In addition, it should be understood that any figures that highlight any functionality and/or advantages, are presented for example purposes only. The disclosed architecture is sufficiently flexible and configurable, such that it may be utilized in ways other than that shown.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A rack system comprising:
   a) a first anchor structurally configured to connect to a first side wall of a bed of a vehicle, the first anchor structurally configured to connect to the first side wall in a position that is:
      i) below a top of the first side wall such that the first anchor does not interfere with the top of the first side wall; and
      ii) above a floor of the bed;
   b) a second anchor structurally configured to connect to a second side wall of the bed, the second anchor structurally configured to connect to the second side wall in a position that is:
      i) below a top of the second side wall such that the second anchor does not interfere with the top of the second side wall; and
      ii) above the floor;
   c) a first angle adjuster:
      i) rotatably connected to the first anchor; and
      ii) comprising a first locking mechanism structurally configured to lock at:
         A) a first angle; and
         B) a second angle;
   d) a second angle adjuster:
      i) rotatably connected to the second anchor; and
      ii) comprising a second locking mechanism structurally configured to lock at:
         A) the first angle; and
         B) the second angle;
   e) a first support member connected to the first angle adjuster;
   f) a second support member connected to the second angle adjuster; and
   g) a cross-member connected between the first support member and the second support member; and
   wherein:
      i) the first angle positions the cross-member higher than a cab height of the vehicle;
      ii) the second angle positions the cross-member lower than the top of the first side wall and the top of the second side wall; and
      iii) the first angle adjuster and the second angle adjuster each comprising:
         A) at least one bearing support member each structurally configured to support an inner race of at least one bearing;
         B) an inner tube comprising:
            a) a first outer surface;
            b) a first inner surface structurally configured to be at least partially supported by an outer race of the at least one bearing; and
            c) a series of holes; and
         C) an outer tube comprising:
            a) a second outer surface;
            b) a second inner surface structurally configured to be at least partially supported by the first outer surface; and
            c) at least one alignment hole, wherein alignment of the at least one alignment hole with a first of the series of holes corresponds to the first angle, and wherein alignment of the at least one alignment hole with a second of the series of holes corresponds to the second angle.

2. The system according to claim 1, wherein the first anchor comprises a first suction cup and the second anchor comprises a second suction cup, the first suction cup and the second suction cup each structurally configured to attach to one of: the first side wall and the second side wall.

3. The system according to claim 1, wherein the first anchor comprises a first magnet and the second anchor comprises a second magnet, the first magnet and the second magnet each structurally configured to attach to one of: the first side wall and the second side wall.

4. The system according to claim 1, wherein the first anchor comprises a first compression plate and the second anchor comprises a second compression plate, the first compression plate and the second compression plate each structurally configured to attach to one of: the first side wall and the second side wall.

5. The system according to claim 1, wherein the series of holes and the at least one alignment hole are structurally configured to receive at least one of the following:
   a) a hitch pin;
   b) a cotter pin; and
   c) at least one spring loaded pin collectively connected to one of the following:
      i) the first inner surface; and
      ii) the second outer surface.

6. The system according to claim 1, wherein the first support member and the second support member are each structurally configured to adjust to a plurality of lengths.

7. The system according to claim 1, wherein the cross-member is structurally configured to adjust to a plurality of lengths.

8. The system according to claim 1, wherein the cross-member is structurally configured to rotate with respect to the first support member and the second support member.

9. The system according to claim 1, wherein the first locking mechanism and the second locking mechanism are each structurally configured to lock at a third angle which positions the cross-member lower than the cab height of the vehicle and higher than the top of the first side wall and the top of the second side wall.

10. The system according to claim 1, wherein the first locking mechanism and the second locking mechanism are each structurally configured to lock at a fourth angle which positions the cross-member lower than a top of a first wheel well and lower than a top of a second wheel well.

11. The system according to claim 1, wherein the first locking mechanism and the second locking mechanism are each structurally configured to lock at a fifth angle which positions the cross-member in contact with the floor.

12. The system according to claim 1, wherein the rack system is structurally configured to adjust to a plurality of bed widths.

13. The system according to claim 1, further comprising at least one cross-member clamp each structurally configured to:
   a) clamp to the cross-member; and
   b) provide an attachment point for at least one rack accessory.

14. The system according to claim 13, wherein:
   a) each of the at least one cross-member clamp comprises at least one pin extending inward from an inner diameter; and
   b) the cross-member comprises at least one hole each structurally configured to receive one of the at least one pin.

15. A rack system comprising:
   a) a first anchor structurally configured to connect to a first side wall of a bed of a vehicle, the first anchor structurally configured to connect to the first side wall in a position that is:
      i) below a top of the first side wall such that the first anchor does not interfere with the top of the first side wall; and
      ii) above a floor of the bed;
   b) a second anchor structurally configured to connect to a second side wall of the bed, the second anchor structurally configured to connect to the second side wall in a position that is:
      i) below a top of the second side wall such that the second anchor does not interfere with the top of the second side wall; and
      ii) above the floor;
   c) a first angle adjuster;
      i) rotatably connected to the first anchor; and
      ii) comprising a first locking mechanism structurally configured to lock at:
         A) a first angle; and
         B) a second angle; and
   d) a second angle adjuster;
      i) rotatably connected to the second anchor; and
      ii) comprising a second locking mechanism structurally configured to lock at:
         A) the first angle; and
         B) the second angle;
   e) a first support member connected to the first angle adjuster;
   f) a second support member connected to the second angle adjuster; and
   g) a cross-member connected between the first support member and the second support member; and
   wherein:
      i) the first angle positions the cross-member higher than a cab height of the vehicle;
      ii) the second angle positions the cross-member lower than the top of the first side wall and the top of the second side wall; and
      iii) the first angle adjuster and the second angle adjuster each comprising:
         A) at least one bearing support member each structurally configured to support an inner race of at least one bearing;
         B) an inner tube comprising:
            a) a first outer surface;
            b) a first inner surface structurally configured to be at least partially supported by an outer race of the at least one bearing; and
            c) at least one alignment hole; and
         C) and outer tube comprising:
            a) a second outer surface;
            b) a second inner surface structurally configured to be at least partially supported by the first outer surface; and
            c) a series of holes, wherein alignment of the at least one alignment hole with a first of the series of holes corresponds to the first angle, and wherein alignment of the at least one alignment hole with a second of the series of holes corresponds to the second angle.

16. The system according to claim 15, wherein the first anchor comprises a first magnet and the second anchor comprises a second magnet, the first magnet and the second magnet each structurally configured to attach to one of: the first side wall and the second side wall.

17. The system according to claim 15, wherein the first support member and the second support member are each structurally configured to adjust to a plurality of lengths.

18. The system according to claim 15, wherein the cross-member is structurally configured to adjust to a plurality of lengths.

19. The system according to claim 15, wherein the rack system is structurally configured to adjust to a plurality of bed widths.

20. The system according to claim 15, wherein the series of holes and the at least one alignment hole are structurally configured to receive at least one of the following:
   a) a hitch pin;
   b) a cotter pin; and
   c) at least one spring loaded pin collectively connected to one of the following:
      i) the first inner surface; and
      ii) the second outer surface.

* * * * *